(12) United States Patent
Rom et al.

(10) Patent No.: US 8,095,620 B2
(45) Date of Patent: Jan. 10, 2012

(54) SYSTEM AND METHOD FOR DYNAMIC ALLOCATION OF A RESOURCE

(75) Inventors: Adam Rom, Tel Aviv (IL); Zvi Ner, Rishon Le-Zion (IL)

(73) Assignee: Elbit Systems Land and C41-Tadiran Ltd., Netanya (IL)

( * ) Notice: Subject to any disclaimer, the term of this patent is extended or adjusted under 35 U.S.C. 154(b) by 1728 days.

(21) Appl. No.: 10/167,401

(22) Filed: Jun. 13, 2002

(65) Prior Publication Data

US 2003/0236854 A1 Dec. 25, 2003

(51) Int. Cl.
*G06F 15/173* (2006.01)
(52) U.S. Cl. .................... 709/217; 709/226; 370/322
(58) Field of Classification Search ........... 709/224–226
See application file for complete search history.

(56) References Cited

U.S. PATENT DOCUMENTS

| | | | |
|---|---|---|---|
| 5,463,629 A * | 10/1995 | Ko ................................ | 370/463 |
| 5,742,594 A * | 4/1998 | Natarajan ...................... | 370/336 |
| 5,978,363 A | 11/1999 | Dimitrijevic | |
| 6,018,528 A * | 1/2000 | Gitlin et al. ................... | 370/436 |
| 6,052,594 A * | 4/2000 | Chuang et al. ................ | 455/450 |
| 6,058,307 A | 5/2000 | Garner | |
| 6,070,052 A | 5/2000 | Ogasawara | |
| 6,366,761 B1 * | 4/2002 | Montpetit .................... | 455/12.1 |
| 6,484,145 B1 * | 11/2002 | Horne et al. ...................... | 705/8 |
| 6,542,739 B1 * | 4/2003 | Garner .......................... | 455/427 |
| 6,754,714 B1 * | 6/2004 | Chebrolu ...................... | 709/229 |
| 6,985,455 B1 * | 1/2006 | Heath et al. ................... | 370/316 |
| 7,016,375 B1 * | 3/2006 | Rosenberg et al. ............ | 370/468 |
| 7,260,069 B2 * | 8/2007 | Ram et al. ..................... | 370/322 |
| 2001/0003830 A1 * | 6/2001 | Nielsen ......................... | 709/226 |
| 2001/0033557 A1 * | 10/2001 | Amalfitano ................... | 370/335 |
| 2001/0039582 A1 * | 11/2001 | McKinnon et al. ........... | 709/226 |
| 2002/0090004 A1 * | 7/2002 | Rinchiuso ..................... | 370/468 |
| 2002/0143945 A1 * | 10/2002 | Shahabuddin et al. ........ | 709/226 |
| 2002/0159513 A1 * | 10/2002 | Williams et al. .............. | 375/222 |
| 2002/0176381 A1 * | 11/2002 | Hammel et al. .............. | 370/329 |

* cited by examiner

*Primary Examiner* — Duyen Doan
(74) *Attorney, Agent, or Firm* — Mark M. Friedman

(57) ABSTRACT

The present invention relates to a system and method for dynamic allocation of a resource. In particular, it concerns a system to dynamically designate a priority for a resource request and to allocate a resource, partially filling or completely filling the request. Partial filling of requests and conditional priorities allows maximum use of resources at low priority while protecting minimum access to resources Thus, the system and method of the present invention improve access and optimization of a Bandwidth On Demand (BOD) satellite communication system. Free resources are used as access channelsthat may be allocated to a user.

13 Claims, 10 Drawing Sheets

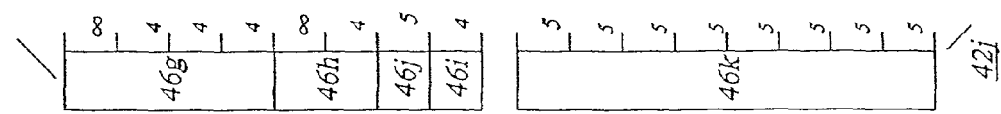
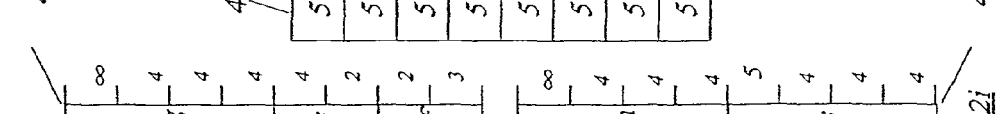
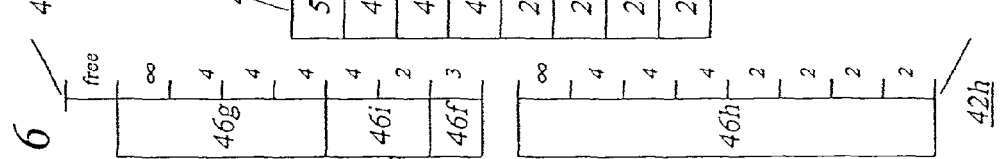
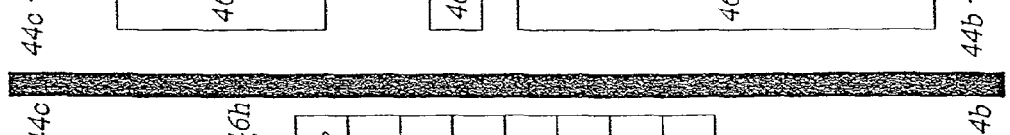
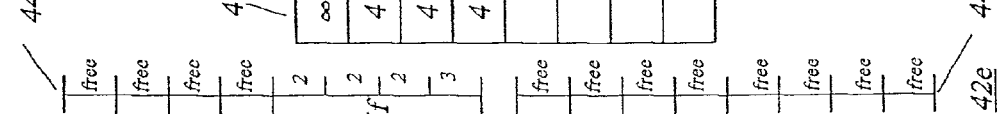
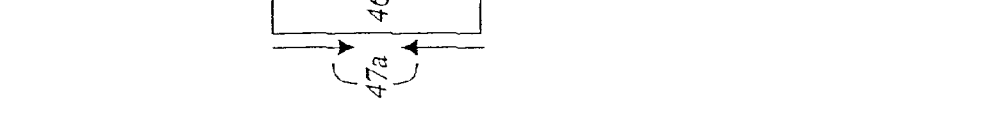
Figure 6

SYSTEM AND METHOD FOR DYNAMIC ALLOCATION OF A RESOURCE

FIELD AND BACKGROUND OF THE INVENTION

The present invention relates to a system and method for dynamic allocation of a resource and, in particular, it concerns a system to dynamically designate a priority for a resource request and to allocate a resource, partially filling or completely filling the request; the system and method of the present invention improve the optimization of a Bandwidth On Demand (BOD) satellite communication system.

Resource allocation systems have the following goals: maximization of resource availability, maximization of resource utility, minimization of cost, and maximization of revenue to resource providers. Maximization of resource availability requires that users not be refused access to the resource in times of need. Maximization of utility requires that when resources are scarce, the most important requests be filled first. Minimization of costs requires that resource requests be filled with minimum investment in resources and overhead. Maximization of revenue to resource providers requires that the resource be provided to the maximum number of users willing to pay for use of the resource.

For example, in a satellite communication network, multiple users of differing characteristics simultaneously communicate with a satellite over various radio frequency bands. Conventional satellite communication systems schedule a frequency band to a single user for a set time. Thus, the scheduled user may communicate with the satellite via the scheduled band at the time scheduled and may not communicate by any other band. Resource scheduling guarantees resource availability to a particular user, but resource scheduling does not maximize availability because a scheduled band is unavailable to an unscheduled user even when the scheduled user does not need the scheduled band. Similarly, resource scheduling does not minimize cost because a user must schedule and pay for exclusive access to more resources than are actually needed. Similarly, scheduling does not maximize revenue or utility because many important paying users are refused access to the scheduled resource.

To make more efficient use of limited satellite resources in fixed bandwidth DAMA systems, a central controller schedules available frequency bands of one or more communication satellites. First, a user requests a frequency band from the central controller. Then the controller allocates a frequency band to the user and communicates to the user the allocated band. When the user no longer needs the allocated band, the user informs the controller and the controller reallocates the band to a new user. The user is only charged for resources that are used and unneeded resources are immediately made available to fill new requests.

The above-described fixed bandwidth DAMA system is well suited to a network where users require a fixed bandwidth. An example of a user requiring a fixed bandwidth is a mobile telephone for voice communication. On the other hand, modern communication networks include broadband users whose bandwidth requirement may not be fixed. Broadband communication is much more efficient than multiple narrow band communication because a broadband user of an n-band frequency range is capable of communicating information $2^n$ times as fast as a user of a narrow one-band frequency range. For example, a broadband ground station can relay calls of sixteen cellular phones using the same bandwidth that would be required by four mobile phones making direct access to the satellite.

Broadband users require a continuous frequency band. For example in a system with a continuous set of frequency bands numbered from one to ten, a broadband user of four frequency bands may be assigned bands 4, 5, 6 and 7 but the broadband user may not be assigned bands 4, 5, 7 and 8 because the latter four bands skip band 6 and are, therefore, not continuous.

The bandwidth required by a broadband user often is not fixed but depends on the number of individuals accessing the broadband resource at a given time. For example a local area network (LAN) includes a plurality of individual computers. Typically the LAN accesses the Internet through a broadband satellite ground station called a remote gateway. The number of individuals accessing data from the Internet on the LAN determines the bandwidth required by the remote gateway. Similarly the bandwidth required by a cellular telephone ground station is dependent on the number of active callers in the region of the station.

Prior art systems for optimizing resource allocation of broadband resources are called Bandwidth On Demand (BOD) systems and include the following:

Dimitrijevic et al. (U.S. Pat. No. 5,978,363) describes a system and method for multidimensional resource scheduling. The system of Dimitrijevic is first come first serve. A new user requests any quantity of requested resources from a central controller. If the requested resources are not allocated to a current user then the request is filled, and the requested resources are allocated to the new user. After allocation to the new user, the requested resources are not available to any other user. If a new user requests a resource that is allocated to a current user, the request is blocked without recourse. When the controller is informed that a current user no longer needs the allocated resources, the controller de-allocates the allocated resources. Deallocation frees resources for reallocation to a new user. Each user is billed according resource use. Resource use is defined as the quantity of resources allocated to the user multiplied by the time over which the resources were allocated to the user. By allowing resources to be scheduled and unscheduled according to need, the Dimitrijevic et al. system optimizes the quantity of resources used. The only limit to resource use in the Dimitrijevic system is the absolute availability of the resource and the willingness to pay of the user. The Dimitrijevic system results in severe limitations on resource availability. Specifically, a few users may block a large quantity of resources. Therefore, in order to deliver reliable access, the Dimitrijevic et al. system requires a very high resource to user ratio.

Garner (U.S. Pat. No. 6,058,307) improves availability of a resource, which is a frequency range, by categorizing potential users by absolute priority. Each user is given an absolute priority. A requesting user of a first priority requests resources. If the requested resources are available in a reserve pool, then the reserve resources are allocated to the requesting user. If the requested resources are not available in the reserve pool, a search is conducted for unassigned resources in active pools. If the requested resources can be made available by switching resources in an active pool then current users are switched and freed resources are transferred to the reserve pool and assigned to the requesting user. If the request cannot be filled from unallocated resources, then the controller assesses the priority level of each current user. When there are insufficient unallocated resources and there is a current user of lower priority level than the requesting user, then the low priority level resources of the current user are preempted. The preempted low priority level resources of the current user are then reallocated to the new user. When there are insufficient unallocated resources and the priority level of all current users is greater or equal to the priority level of the requesting user, the request is blocked. Garner further categorizes resources into multiple pools and allows a user to have an arbitrary priority level in each pool. Thus the Garner system allows priority users improved access to resources as compared to the Dimitrijevic system. This improves the utility of the Garner system because when resources are scarce, resources are preferentially allocated to high priority users. Furthermore, the Garner system offers lower cost service to low priority users because the system can accept large numbers of low priority users at low resource to user ratio and at a low cost. Priorities are an absolute user parameter in the Garner system. For a given resource pool, a particular user has a single priority level which applies to all resource use of the user in the resource pool. When a particular user wishes to have reliable access to resources in a desired resource pool the particular user must request high priority for all resource in that pool and pay a correspondingly high price for all resource requests in the desired pool. A user who chooses cheaper low priority service risks having service cut off in the middle of a transmission. Resource allocation to users of similar priority level is first come first serve like the system of Dimitrijevic et al. Therefore the Garner system can only give reliable service to a small number of high priority users. Furthermore, it is difficult to optimize resource allocation in the Garner system because there is a complex set of multiple pools and the division of analog resources in each pool may take on an unlimited number of configurations.

Ogasawara et al. (U.S. Pat. No. 6,070,052) improves on the Garner system of allocating frequency resources by rationalizing the switching of active resources. Thus frequency bands are allocated according to current need as in the Gardner system, and frequency bands are assigned such that users can expand their bandwidth with a minimum amount of switching. Nevertheless the resources priority algorithm of Ogasawara is similar to the algorithm of Gardner.

Thus, resource allocation systems in the prior art assign resources absolutely. In the prior art a request for resources may only be filled or blocked completely. In the prior art resource allocation systems, there is no limit to the quantity of resources that may be requested by a user. Therefore a few current users can block access to a large quantity of resources. None of the prior art resource allocation systems can guarantee resource access to a large number of users. Furthermore, prior art frequency allocation systems allocate frequencies in analog quantities. Analog quantities can be divided into an infinite number of configurations and the large number of configurations complicates optimization of decision. Even when frequency is discretized, bandwidths and free frequency bands can have arbitrary sizes seriously complicating the matching of requests for bandwidth to available free bands.

There is therefore a widely recognized need for, and it would be highly advantageous to have, a resource allocation system that allows reliable access to a large number of users and without unnecessarily preventing access to unused resources. Furthermore, it is desirable that the system allows efficient optimization of resource assignment.

DEFINITIONS

A potential user is an entity that has permission to request allocation of a resource.

A part of a resource is available at a priority level x if it is allocated at a priority level x and x is less than infinity. Reallocation of an available resource to a new user requires that the new user have a priority level sufficient for allocation of the resource according to the availability of the resource. For example, in a system where allocation of resources to two users of equal priority level is on a first come first serve basis, a new user cannot preempt a prior user with an equal priority level. Therefore, in a first come first serve system, a priority level sufficient for allocation of the resource is a priority level higher than the availability level of the resource.

A part of a resource is free if the part of the resource is available to an ordinary user, and the part of the resource is unallocated. Equivalently, a free resource is defined as a resource that is available at a priority level zero.

A new user is a potential user who has requested allocation of a resource.

A current user is a user to whom a part of the resource is currently allocated.

An absolute priority is a priority that is designated for all requests for a resource by a user unconditionally and independent of circumstances.

Conditional priority is a priority that is designated for a request for a resource by a user, the priority being dependent on the circumstances of the request or a set of rules.

A request for a resource is a showing of intent to use a resource and may be explicit (requesting a resource over an access channel) or implicit (not canceling a previous resource request); a request for a divisible resource may be subdivided.

Frequency Division Multiple Access (FDMA) is a method to allocate a resource in which each user is allocated a frequency band. FDMA is a method to allocate a one-dimensional resource. The frequency band is allocated to a user for a predetermined time. Changing the resource allocation requires bilateral agreement of the user and the resource controller.

Conventional FDMA or frequency scheduling is FDMA wherein frequency bands are allocated according to a fixed scheduled. Allocation does not change according to the needs of the user.

Demand Assignment Multiple Access (DAMA) is FDMA wherein a fixed bandwidth frequency band is dynamically allocated or deallocated by the controller on demand from the user. Temporal changes in frequency allocation require two-way communication between the user and the central control. Specifically, the user must demand a change in allocation and the controller must communicate the new status of the allocation to the user.

Bandwidth On Demand (BOD) is FDMA wherein the bandwidth is dynamic and can be changed by the controller on demand from the user. Temporal changes in frequency allocation require two-way communication between the user and the central control. Specifically, the user must demand a change in allocation and the controller must communicate the new status of the allocation to the user.

Time Division Statistically Multiplexing (TDSM) is a method of allocation of a two-dimensional (time and frequency) resource. Specifically, in TDSM, a controller communicates on a specific frequency band to a plurality of users. The controller unilaterally directs the signal at a specific time to an intended user. The controller communicates the beginning and end of the specific time to the intended user. Similarly the controller unilaterally may change (expand, contract or switch) the frequency of the band.

A finite priority level, as defined herein, is a priority level less than infinity and greater than zero.

As used herein, the term "allocating a part of a resource to a portion of a request" includes both filling a portion of the request when the priority level of the portion of the request is sufficient for filling the portion of the request according to the availability of the resource, and also includes blocking a portion of the request when priority level of the portion of the request is insufficient for filling the request according to the availability of the resource. A resource to user ratio is a measure for the total load on a network (or satellite space-segment). A higher resource to user ratio signifies a lower the load on the network.

SUMMARY OF THE INVENTION

The present invention is a system and method for dynamic allocation of a resource and, in particular, it concerns a system to dynamically designate a priority for a resource request and to allocate a resource, partially filling or completely filling the request; the system and method of the present invention improve the optimization of a Bandwidth On Demand (BOD) satellite communication system.

According to the teachings of the present invention there is provided a method for apportioning a resource between a new user and a current user according to a request from the new user. A resource provider searches for an available part of the resource to fill the request. The provider allocates, from the available part of the resource, sub-parts to fill a minimum allocation of the current user and to fill a minimum allocation of the new user. After filling the minimum allocations, the remaining sub-parts of the available part of the resource are shared between the new user and the current user.

According to further features in the described preferred embodiments, searching is accomplished by means of a sliding window. The available part of the resource is the part of the resource within the sliding window. The requesting user shares the available resource with the prior user within the sliding window.

According to further features in the described preferred embodiments searching is limited to a maximum number of disconnections.

According to another embodiment of the current invention there is provided, a method for designating a priority for a request from a user for a resource. The method includes a first step of providing a priority agenda for the user. The priority agenda includes at least one priority level and a condition under which the user designates the priority level for at least one portion of the request. Some examples of conditions for access to resources at a priority level by a user include but are not limited to: the current use of the resource by the user, the time of day, the day of the week, atmospheric conditions, the expected demand and available reserve resources (for example the charge state of a satellite battery), the application requiring the resource, political and economic circumstances pertaining to communication needs.

The method includes a second step of designating the priority of the request by apportioning each priority level to a corresponding portion of the request according to the agenda.

According to further features in preferred embodiments of the invention described below, the priority agenda further includes a maximum allocation of the resource to the user.

According to still further features in the described preferred embodiments the priority agenda further includes a minimum resource allocation to the user. Resources less than the minimum allocation may not be preempted.

According to still further features in the described preferred embodiments the priority agenda includes a minimum resource allocation, a maximum resource allocation and exactly one finite priority level. The finite priority level is applied to all resources requested for more than the minimum resource allocation and for less than the maximum resource allocation of the user.

According to another embodiment of the current invention, a method is provided for allocating a resource among a plurality of users. In the method a respective priority agenda is provided for each user. The priority agenda includes at least one priority level and a condition under which the priority level is designated for a corresponding portion of a request from the user. According to the method the respective priority levels are designated for each corresponding portion of the request according to the agenda. When the respective priority level of a portion of the request is sufficient to fill the portion of request by allocating a part of the resource according to the availability of the part of the resource, the portion of the request is filled. When the respective priority level of a portion of the request is not sufficient to fill the portion of request according to the availability of the part of the resource, the portion of the request is blocked.

According to further features in preferred embodiments of the invention described below, the resource is further partitioned into a plurality of blocks. Each request is then for a number of blocks. The number of blocks in a request is constrained to be an integral power of 2.

According to still further features in the described preferred embodiments, multiple requests for allocation of a resource at identical respective priority levels are filled on a first come first serve basis According to still further features in the described preferred embodiments, allocating a part of the resource may include but is not limited to blocking the request, completely filling the request, partially filling the request, switching a resource allocation of a current user, completely preempting an allocated resource from a current user, or partially preempting an allocated resource from a current user.

According to still further features in the described preferred embodiments, the magnitude of a resource allocation is constrained to one magnitude chosen from a proper subset of the possible magnitudes of resource allocations. Therefore whether an allocation is a new resource allocation or a change in the allocation of a prior user, the magnitude of the allocation must be of a magnitude within the subset. For example, in case the possible quantities of allocation are the set of whole numbers less than 20, the number of resource blocks in an allocation may be constrained to be a member of the subset $\{1, 3, 7, 13\}$. The subset $\{1, 3, 7, 13\}$ is a proper subset of the possible quantities—the set of whole numbers less than 20.

According to still further features in the described preferred embodiments, partially filling the request is accomplished by filling a portion of the request. The portion is the request contracted by an integral power of 2.

According to yet another embodiment of the present invention, a system is provided to determine a resource allocation according to a request from a user amongst a plurality of potential users. The system includes a database. The database contains data on availability of the resource and a respective priority agenda for each user. Each priority agenda includes at least one priority level. Each priority agenda also includes a condition under which a corresponding priority level is designated for a portion of the request from the user. The system further includes a processor for designating a priority for at least one portion of the request according to the priority agenda of the requesting user. The processor also serves to determine a resource allocation.

According to further features in preferred embodiments of the invention described below, a priority agenda may include a minimum allocation of the resource.

According to still further features in the described preferred embodiments, the user designates a priority level for a portion of a request. Specifically, designation of a particular priority level to a request from a user is conditional to the user requesting the particular priority level. Thus the user chooses a priority of a portion of a request the suitable to the application requiring the resource. Particularly, the user designates a high priority for important applications and a low priority for unimportant applications.

According to still further features in the described preferred embodiments the database further includes data on resource use. Specifically, the resource use data includes the amount, time and priority of resources allocated to each user. The resource use data serves to for determining billing for the user.

According to yet another embodiment of the present invention there is provided a BOD communication network. In the network a central controller allocates a frequency band from a plurality of frequency bands to a particular user from a plurality of potential users according to a request of the particular user. The controller includes a database and a processor. The database contains data on availability of the frequency bands, and a respective priority agenda for each user. In each priority agenda there is included at least one priority level, and a condition under which the priority level is designated for at least one portion of a request from each user. The processor serves for designated a priority level for each portion of the request according to the conditions in the priority agenda of the user making the request. The processor further serves for allocating frequency bands to fill each portion of the request according the availability of the resource. Specifically, for each portion of the request, if the priority level is sufficient to fill the portion of the request by allocating a part of the resource, then the portion of the request is filled. If the priority level of the portion of the request is not sufficient to fill the portion of the request by allocating a part of the resource, then the portion of the request is blocked.

According to yet another embodiment of the present invention there is provided a bandwidth on demand method to optimize allocation of a plurality of frequency bands from a frequency range amongst a plurality of users. Each user is provided a priority agenda. The priority agenda includes at least one priority level and a condition under which a portion of a request from the user receives the priority level. A priority level is assigned to each portion of the request according to the agenda. When the priority level of a portion of the request is sufficient for allocation of a frequency band according to the availability of the band, the frequency band is allocated to fill the portion of the request.

According to the present invention, priority is designated for resource requests conditionally and requests for a resource may be filled or blocked in whole or in part. With conditional priority, users are allowed to have high priority access to small quantities of resources and low priority access to extra resources. Thus a large number of users have reliable access to a minimum quantity of resources while maximum use of resources is guaranteed because all unallocated resources are available for low priority use.

According to the present invention, resource decision optimization is facilitated by discretization. Frequency bands are allocated, expanded and contracted according a limited number of configurations.

According to yet another embodiment of the present invention there is provided a method for allocating a resource to fulfill a request from a user according to a priority agenda. In the method, the bandwidth of a prior user is reduced when the request can not be fully fulfilled from available resources and when the priority agenda of the new user includes a priority level sufficient to preempt resources from the prior user. In the method, when the request cannot be fulfilled from available resources the request is partially fulfilled according to the priority agenda of the user and the availability of the resource.

According to yet another embodiment of the present invention there is provided a method for modifying allocation of a resource. According to the method a plurality of potential actions are defined by which to fill a request. Rules are set. The rules delineate under what conditions to perform each of the actions. A procedure is provided by which to modify the rules.

According to further features in the described preferred embodiments the procedure for modifying the rules may include but is not limited interactive input or a computer algorithm. The algorithm making specified changes to the rules according to specified conditions.

According to still further features in the described preferred embodiments the method for modifying allocation of a resource further includes supplying a procedure to modify the actions by which a request is fulfilled.

According to yet another embodiment of the present invention there is provided a method for allocating a communication resource according to a request from a user. An unallocated part of the resource is provided as an access channel for communicating requests. The access channel is allocated to the requesting user when the channel suffices to fill the request or when there are insufficient resources available to completely fill the request and the access channel suffices to partially fill the request.

According to further features in the described preferred embodiments, when there are not enough available access channels, an additional request is generated for a new access channel.

According to still further features in the described preferred embodiments when there are not enough available access channels, the request from the-user is blocked.

According to still further features in the described preferred embodiments the method further includes the step of broadcasting a list of free access channels to a potential user.

BRIEF DESCRIPTION OF THE DRAWINGS

The invention is herein described, by way of example only, with reference to the accompanying drawings, wherein:

FIG. 6 illustrates the method of FIG. 5 for allocating bandwidth according to the present invention;

FIG. 8a is a flow chart illustrating a method for allocating a resource to fulfill a request from a user according to a priority agenda;

FIG. 8b is an illustration of the initial resource configuration of FIG. 8a;

DESCRIPTION OF THE PREFERRED EMBODIMENTS

The present invention relates to a system and method for dynamic allocation of a resource and, in particular, it concerns a system to dynamically designate a priority for a resource request and to allocate a resource, partially filling or completely filling the request. In particular, the system and method of the present invention improves the optimization of a Bandwidth On Demand (BOD) satellite communication network. Consequently, the present invention is illustrated herein with reference to such a satellite communication network.

The principles and operation of a system and method to dynamically designate a priority for a resource request and to allocate a resource according to the present invention may be better understood with reference to the drawings and the accompanying description.

A Satellite Communication Network—System for Allocating Bandwidth

Figure 1:
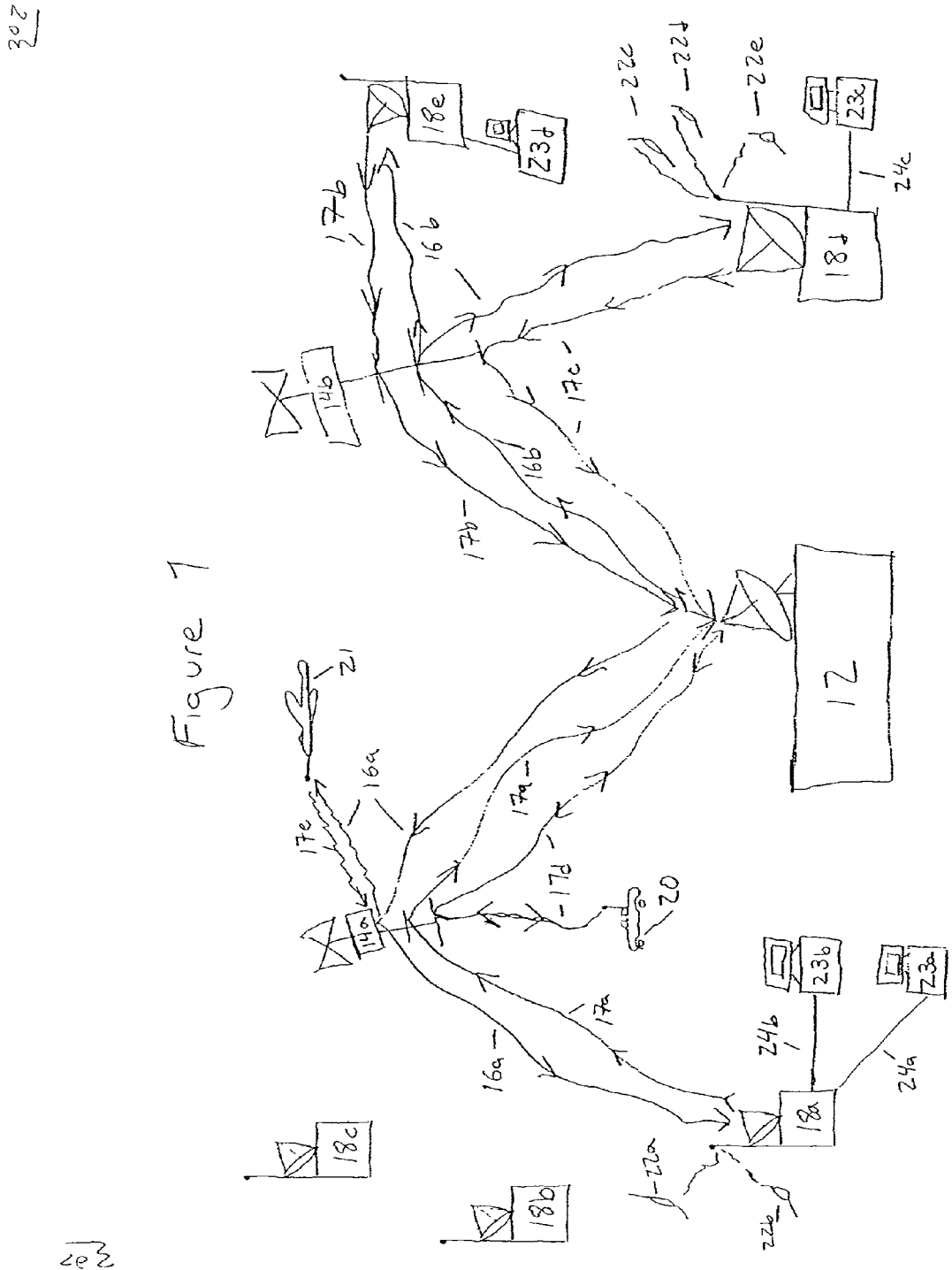
FIG. 1 illustrates a satellite communication network.

Referring now to the drawings, FIG. 1 illustrates a satellite communication network. The network of FIG. 1 contains a central controller 12. Central controller 12 uses satellites 14a and 14b to relay microwave signals transmitted by controller 12 in prescribed microwave frequency bands 16a and 16b. Satellite 14a relays signals in band 16a from controller 12 while Satellite 14b relays signals in band 16b from controller 12. Two users, a ground station 18a and a portable multi-band receiver 21 receive signals in band 16a from satellite 14a. Two users, a ground station 18d and a ground station 18e, receive signals in band 16b from satellite 14b. Signals 16a and 16b are Time Domain Statistical Multiplexing (TDSM) signals characterized by a particular frequency range and divided in time. Thus, during part of the time signal 16a carries a message for ground station 18a while at other times signal 16a carries a signal for portable multi-band receiver 21. Similarly, during part of the time signal 16b carries a message for ground station 18d while at other times signal 16b carries a signal for ground station 18e. Two potential users, ground station 18b and ground station 18c are not currently communicating with any satellite.

Controller 12 also communicates to a dedicated frequency portable transmitter 20 over a frequency band 17d. Transmitter 20 is limited to a single frequency band 17d. Therefore transmitter 20 has absolute priority on frequency band 17d and may preempt any user from frequency band 17d at any time. A user that has a dedicated band for communication, such as transmitter 20, is referred to herein as a dedicated band user.

Portable multi-band receiver 21 is an aircraft radio. Receiver 21 can communicate on an arbitrary frequency, but uses a fixed bandwidth. Due to the imperatives of aircraft communication, receiver 21 has absolute priority for communication. The bandwidth of receiver 21 is fixed and cannot be changed. A user such as receiver 21 that must always be allocated a particular bandwidth is referred to herein as a fixed bandwidth user.

Ground station 18a receives radio signals from multiple cellular telephones 22a and 22b. Ground station 18a also receives signals via cables 24a and 24b from local area computer networks (LAN) 23a and 23b. Ground station 18a transmits the signals from telephones 22a and 22b as well as the signals from LAN 23a and 23b over a frequency band 17a via satellite 14a to controller 12. Controller 12 then retransmits each signal to an intended recipient over an appropriate band. For example when the intended recipient is a computer connected to another LAN 23c then controller 12 retransmits the signal over band 16b via satellite 14b to ground station 18d. Ground station 18d further sends the signal over a cable 24c to LAN 23c. LAN 23c then communicates the signal to the appropriate computer. Similarly, when the intended recipient is mobile transmitter 20 then controller 12 retransmits the signal over band 17d via satellite 14a to mobile transmitter 20.

Due to the fact that the communication needs of LANs 23a and 23b vary in time and similarly the number of cellular telephones using ground station 18a varies with time, therefore the bandwidth of the frequency band 17a required by ground station 18a also varies with time. When the required bandwidth of band 17a changes, ground station 18a relays a message to controller 12 requesting the change in bandwidth. Because ground station 18a is not in direct communication with other users, therefore while allocated to ground station 18a, band 17a is unavailable to any other user and can only be changed by controller 12.

Similarly to ground station 18a, ground station 18d receives time and frequency divided signals from controller 12 over band 16b and sends data on band 17c to controller 12 the data being from cellular phones 22c, 22d, and 22e and LAN 23c. Similarly ground station 18e relays data from another LAN 23d via band 17b, and ground station 18e receives time divided messages from controller 12 in band 16b. A user that has a variable bandwidth, such as ground stations 18a-18e, is referred to herein as an ordinary user.

According to the availability of the frequency band resource, controller 12 allocates and reallocates frequency bands according to requests.

In the network of FIG. 1 frequency bands 17a-c are BOD bands and change according to the time variable demand of the user. Band 17e is a DAMA band that may be allocated or cancelled on demand and may also be switched and moved to different frequency bands. Nevertheless, the bandwidth of band 17e is fixed. Band 17d is a dedicated narrow frequency band. Bands 16a-b are allocated according to TDSM.

Bands 17a-17c are allocated according to conditional priority. Controller 12 designates priority for each request for allocation of frequency bands according to a priority agenda 54 (see FIG. 5) each user having exactly one priority agenda. Priority is designated for a request according to the circumstances of the request and according to the agenda of the user making a request.

Overview of Priority Agendas and Methods for Allocating Resources

A priority of a request is a set of priority levels. Each priority level is designated for a portion of a request subject to a condition. Each priority level is represented by a whole number. A higher number represents a higher priority. Therefore the maximum priority signifies that the request must be filled by any available resources and the maximum priority is represented by the number infinity. Resources that are not assigned to any current user are referred to as free resources. Free resources are allocated to any requesting user. Free resources and resources assigned to a current user at priority level less than infinity are referred to as available resources. Resources assigned to a current user at a finite priority level can only be preempted and reallocated to a request having sufficient priority.

When a current user has a minimum allocation, resources can only be preempted from the user when the user will remain after preemption with at least the minimum allocation.

Other privileges associated with a minimum resource allocation depend on the configuration of the resource, the distribution of access to priority levels and the resource to user ratio. For example, in one distribution of priority, every user is assigned the same minimum resource allocation. When every user has a minimum resource allocation, then once resources are allocated to a user, the user can never be entirely knocked out of the network by preempting all resources assigned to the user. In an alternative distribution of priority, the size of the minimum allocation assigned to each user varies between users. In another alternative distribution of priority, some users have a minimum allocation while other users have access to finite priority levels only. The current allocation of a user with no minimum resource allocation may be entirely preempted temporarily knocking the user off the network. In one embodiment, the minimum allocation is only in regards to preemption (preemption must leave a current user with at least the minimum allocation), but new requests for a minimum allocation receive the same finite priority level as requests by the user for resources beyond the minimum allocation. In another network, new requests for the minimum allocation receive a higher priority level than requests for access to resources beyond the minimum allocation. In yet another embodiment, requests for a minimum allocation receive an infinite priority level and can preempt all available resources.

A possible embodiment of minimum allocation guarantees that every user always has access to the minimum allocation of the user. The provider guarantees that there are always sufficient available resources by providing a large resource to user ratio.

When the resource to user ratio is not sufficient to handle all maximum priority levels of all users simultaneously, then at any particular time, all of the resources may have already been allocated at the maximum priority level. When all of the resources are allocated at the maximum priority level in a first come first serve system, a new request for resources is blocked even if the new request received the maximum priority level. When all of the resources are allocated at the maximum priority level in a round robin sharing system a new user requesting resources at the maximum priority level will be partially blocked and prior users will be partially preempted. Because the total access to the maximum priority level is limited, the likelihood that requests for resources at the maximum priority will be filled is a function of the ratio of the total resources to the sum of access of all users to the maximum priority level.

A particular user may have access to only a small subset of the available priorities and therefore the priorities in an agenda may be an arbitrary subset of the set of whole numbers. Some examples of conditions for access to resources at a priority level by a user include but are not limited to: the current use of the resource by the user, the time of day, the day of the week, atmospheric conditions, the expected demand and available reserve resources (for example the charge state of a satellite battery), the application requiring the resource, political and economic circumstances pertaining to communication needs.

A Simple Resource Allocation and Sliding Window Searching Method Including a Minimum Allocation and a Single Finite Priority Level We now refer to FIGS. 2a-d, which illustrate a simple embodiment of a method for apportioning a resource (the resource is represented by the horizontal space A-A'). The resource is to be apportioned between a new user 18n and current users 18f-18m. In FIGS. 2a-d, the resource being apportioned is a radio frequency range. The resource is used for communication. Each user requests access to a continuous band of frequency of a specified bandwidth. Bandwidth is represented in FIGS. 2a-d by horizontal distance, a longer horizontal line segment representing a greater bandwidth, a continuous segment representing a continuous band and a discontinuous segment representing a discontinuous band. Thus, in the embodiment of FIGS. 2a-d the term segment is used interchangeably with the term a part of the resource.

New user 18n requests a 10 blocks of the resource represented by a dashed box 18n. The part of the resource currently allocated to current users 18f-18m is represented by solid boxes occupying a part of the horizontal space A-A. In order to fill the request a search is made for continuous free segment (represented as space between the solid boxes). Efficient methodology of searching for free space is described in *The Art of Computer Programming, Volume* 3: *Sorting and Searching, Second Edition*, D. Knuth, Addison Wesley Longman, Inc. 1998. Ch. 2.5 "Dynamic Storage Allocation".

Because there is no single continuous segment of free resource sufficient to fill the request of new user 18n, a search is performed for non-continuous free segments that can be made continuous. The segments are made continuous by disconnecting a current user and shifting or removing the user. In this embodiment, disconnecting means deallocating resources currently allocated to the user. Shifting a current user means reallocating to the user a part of the current search window. Removing a current user means reallocating to the user a part of the resource not in the current search window. The goal is to obtain the requested continuous free segment or the longest possible free segment with a minimum number of disconnections. There is a trade-off between the number of disconnections and the bandwidth utilization. Allowing more disconnections increases the user interruption, but also increases the bandwidth utilization. The increase in bandwidth utilization is achieved by switching users to adjacent bands to fill "holes" (unused bands) between allocated parts of the frequency range. If we limit the number of disconnections, then the users are interrupted less when switching bandwidth places, but the bandwidth becomes fragmented.

In the embodiment of FIGS. 2a-d, the maximum allowable number of disconnections is $\lambda=2$. In the embodiment of FIGS. 2a-d, there is only one finite priority level. The finite priority level is designated for any request above the minimum allocation of a user. All allocated resources may be disconnected, shifted or removed to fulfill any request. Furthermore, resources allocated above the minimum allocation of any current user may be preempted and shared with any new user. In an alternative embodiment, permission to shift, remove or preempt a current user may depend on a priority level designated for a new user and a priority level designated for the current user.

Searching uses a sliding window 28a between starting pointer p1 and an ending pointer p2. The portion of the resource inside the sliding window is the available part of the resource. Pointer p1 is set at one end of the resource. For example, in the horizontal space of FIG. 2a, pointer p1 starts at the left end of the leftmost free segment of the resource. In a radio frequency band, pointer p1 starts at the low end of the lowest free band. Pointer p2 is set at a point ahead (to the right) of pointer p1. For any set of locations of pointers p1 and p2, there is a maximum continuous segment of the resource that can be freed by disconnecting k current users between pointers p1 and p2. Disconnection includes either shifting an allocation of a user within window 28a or removing a user to a free segment outside of window 28a. In the embodiment of FIGS. 2a-d, a current user may be removed to a segment outside of the sliding window 28a-d only if the outside segment contains sufficient bandwidth to fill the entire current allocation of the removed user.

Figure 2:
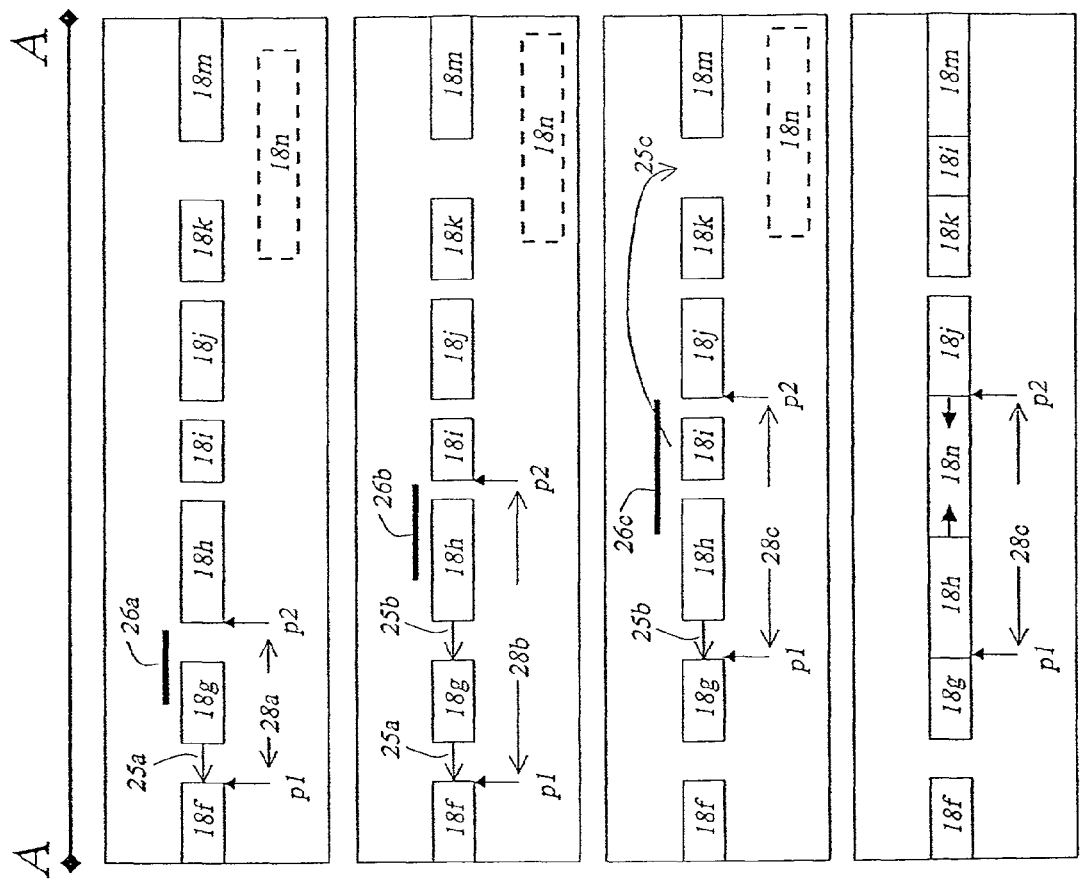
FIG. 2 illustrates an embodiment of a simple method of allocating a resource between a new user and a current user including a minimum allocation and a single finite priority level for all users wherein searching is accomplished using a sliding window.

Specifically in FIG. 2a, resource segment 26a is freed by disconnecting one user 18g and shifting the allocation of user 18g to the left according to arrow 25a. Because there is one user 18g in the window 28a, therefore k=1 in FIG. 2a (k is the number of current users in the current sliding window 28a). In FIG. 2b, pointer p2 has been moved to the right and there are two users 18g-18h in window 28b. Therefore, k=2 in FIG. 2b. Disconnecting users 18g and 18h and shifting the allocations of users 18g-18h according to arrows 25a-25b frees segment 26b. For each location of pointer p1, a loop is performed moving pointer p2 to the right for k=1 to λ. At the end of the loop pointer p1 is shifted one step to the right and a new set of possible solutions are tested for k=1 to λ. Specifically, in FIG. 2c, pointer p1 has been shifted one step to the right to form window 28c and k=2. In FIG. 2c, a maximum continuous free segment 26c can be obtained by shifting the allocation of user 18h according to arrow 25b and by removing the allocation of user 18i to the free space between users 18k and 18m according to the arrow 25c. In the example of FIGS. 2a-d, only user 18i can be removed because the allocation of every other user is larger than the largest existing continuous free segment.

For all of the possible locations of pointers p1 and p2 for k≦λ=2, the maximum free continuous space is segment 26c. If the resulting segment 26c were big enough to fill the entire request of user 18n, then user 18h would be shifted as illustrated by arrow 25b and user 18i is removed as illustrated by arrow 25c and segment 26c would be allocated to completely fill the request of new user 18n. In the illustration of FIG. 2d, the maximum continuous segment 26c is not sufficient to completely fill the request of new user 18n. Therefore, the available continuous space must be shared.

Sharing is illustrated in FIG. 2d. Window 28c includes disconnected prior users 18h and 18i and new user 18n. Space has been found for user 18i outside of window 28c; therefore user 18i is removed as illustrated by arrow 25c. Thus, users 18h and 18n share window 28c.

Sharing proceeds in three phases. First a minimum sub-part is allocated to all prior users sharing the window 28c. The minimum sub-part for a prior user is either the minimum allocation of the user or the allocation of the user previous to disconnection whichever is smaller. Second, after all prior users receive a minimum sub-part, to the new user is allocated a minimum sub-part. If the space remaining in window 28c is less than the minimum allocation of the new user, then the minimum sub-part of the new user is all the remaining space. If the remaining space is greater or equal to the minimum allocation of the new user then minimum sub-part of the new user is the minimum allocation. Third, after the new user has received a minimum sub-part, then the remaining free sub-part of the segment is shared by sequentially allocating resource blocks from the free sub-part to each user in a round robin fashion.

Figure 3:
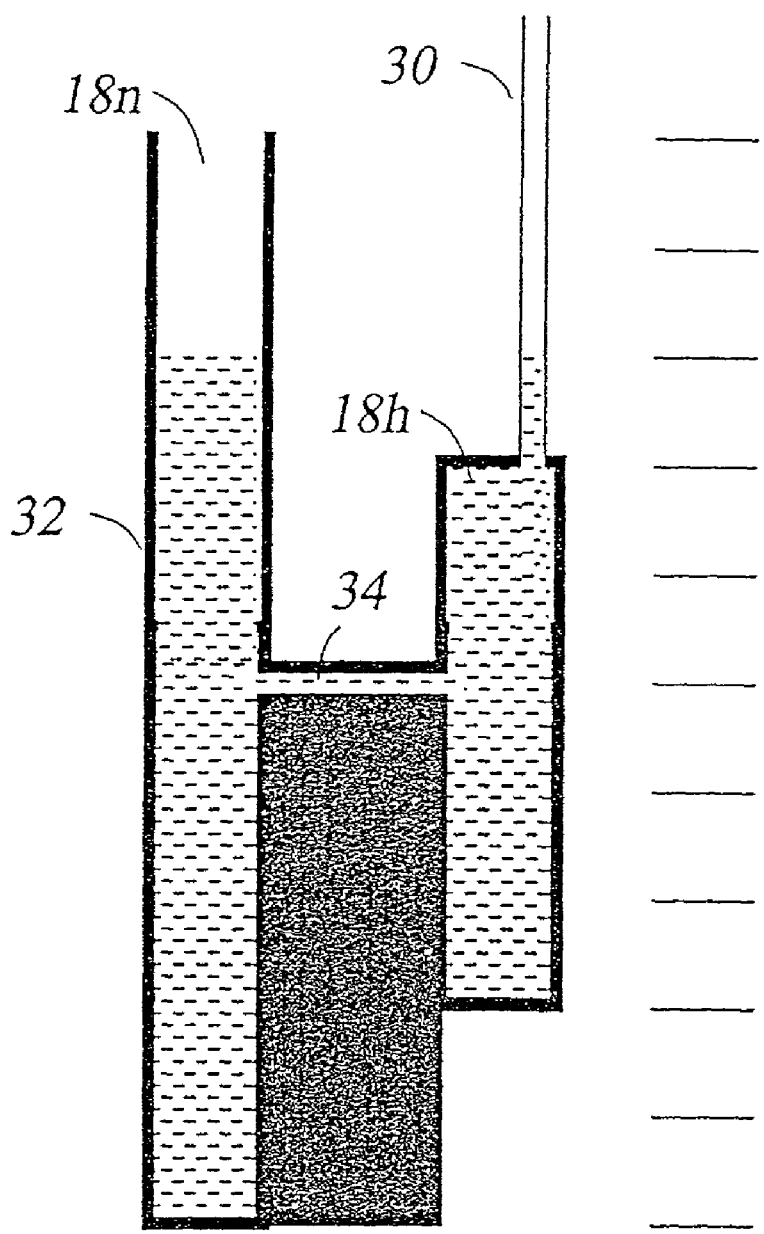
FIG. 3 illustrates round robin sharing as described in the embodiment of FIG. 2.

The round robin sharing is illustrated metaphorically in FIG. 3 as pouring water (represented by hatched area in the FIG. 3) through a spout 30 into a vessel 32. Two users 18h and 18n are represented each by a vertical tube. The applied water volume represents the quantity of shared resource., The minimum allocation of each user 18h, 18n is represented by the volume contained in the corresponding tube below a horizontal channel 34. The volume contained in each tube above channel 34 represents resources requested above the minimum allocation. Horizontal lines on the right side of FIG. 3 demarcate resource blocks. The volume contained in each vertical tube between two consecutive lines represents one resource block. Water entering spout 30 first fills the three block minimum allocation of prior user 18h. After filling the minimum allocation of user 18h water flows through channel 34 and fills the five block minimum allocation of new user 18n. After user 18n receives a minimum allocation the remaining water is divided evenly between the unfilled requests. If the applied water volume is insufficient to raise the water level to a height completely filling the smaller request (in FIG. 3, the smaller request belongs to user 18h) then water beyond the minimum allocations is divided evenly between user 18h and 18n. If the applied water suffices to fill request 18h, then after water level rises to fill the entire request of user 18h further water goes entirely to user 18n until the request of user 18n is filled.

Specifically, in FIG. 2d, current user 18h and new user 18n share window 28c. The minimum allocation of user 18h is three blocks (see FIG. 3) and the minimum allocation of user 18n is five blocks (see FIG. 3). The current allocation of user 18h is five blocks and the requested allocation of new user 18n is 10 blocks. Window 28c includes 13 blocks. Sharing proceeds in three phases. In the first phase, current user 18h receives the minimum allocation of three blocks leaving 10 free blocks. In the second phase, new user 18n receives the minimum allocation of five blocks leaving five free blocks.

At the beginning of the third phase the leftover free sub-part of window 28c is five blocks. The five blocks are shared between user 18h and 18n in a round robin fashion. Specifically, one block is allocated to current user 18h such that to user 18h is allocated a total of four blocks and there remain four free blocks. Then a block is allocated to new user 18n such that to user 18n is allocated a total of six blocks and there remain three free blocks. Then a second block is allocated to user 18h such that to user 18h there are allocated five blocks and there remain two free blocks. The original full allocation of user 18h before the disconnection was five blocks. Therefore, user 18h has received the full allocation due to user 18h. Thus, the only user sharing window 28c with a yet unfilled resource requirement is user 18n. Therefore, the remaining two free blocks of window 28c are allocated to user 18n. The final allocation to user 18n is eight blocks. The reduction in bandwidth of user 18n from 10 requested blocks to 8 allocated blocks is represented in FIG. 2d by inward pointing arrows.

In FIG. 2d there remain two free segments from the resource, one between users 18f and 18g and another between users 18j and 18k. The free segments are for use as access channels. Access channels are provided for random access of new users who wish to connect. A free access channel list is broadcast to all users. Each access channel is allocated resources as a current user with request and minimum allocation of one block. Therefore, an access channel can be shifted or removed, but can not be preempted. When an access channel is shifted or removed, the list is updated and the updated list is broadcast to all users. When a new user requests resources on an access channel, if the bandwidth of the access channel suffices to fill the request, the access channel is allocated to the new user. If reallocating the access channel to the user reduced the number of access channels below a minimum number of access channels, then a new request is generated to allocate a new segment to the access channel.

Figure 4:
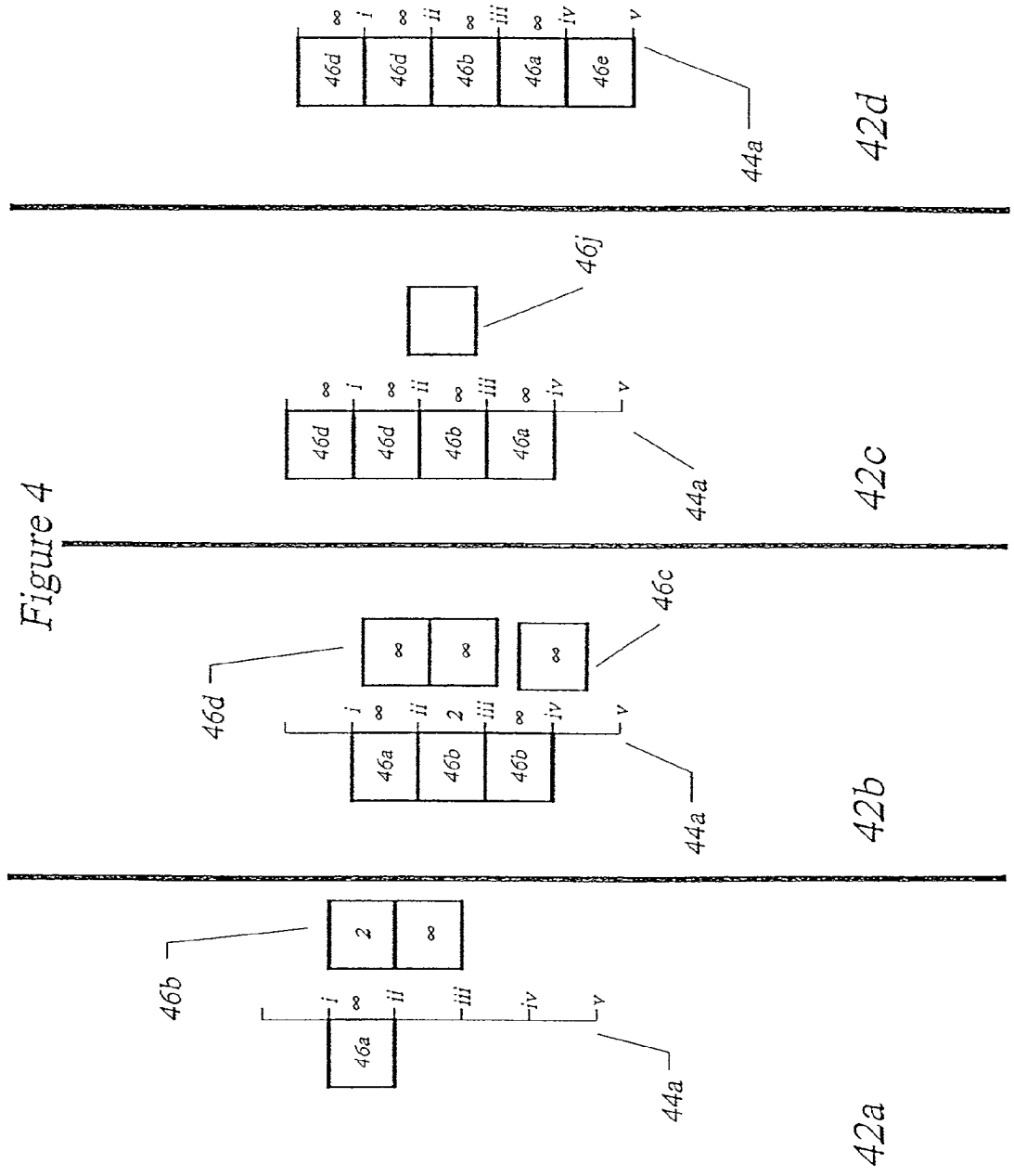
FIG. 4 illustrates another embodiment of a method for allocating bandwidth according to the present invention wherein each user has a minimum allocation, a maximum allocation and a single finite priority level.

A Method for Allocating a Resource Wherein Each User Has a Minimum Allocation, a Maximum Allocation and a Single Finite Priority Level We now refer to FIG. 4, which illustrates a simple embodiment of a method for designating a priority to a request for a resource and for allocating the resource among a plurality of users. FIG. 4 is divided into four time frames 42a-42d. Time frames 42a-42d are arranged in temporal order from left to right and separated by dark black lines.

The shared resource in FIG. 4 is a frequency range 44a for communication with a communication satellite 14a. Range 44a is represented by a vertical line segment. Range 44a is divided into 5 blocks i, ii, iii, iv, v. Each block i-v is represented by a sub-segment of the vertical line segment representing range 44a. Blocks i-v are labeled below and to the right of each segment with a lower case Roman numeral.

Each unallocated block i-v is represented in FIG. 4 by a sub-segment that is not in contact with a rectangle. Each allocated block i-v is represented by a sub-segment that is in contact with a rectangle on the left side of the segment. Furthermore, to the right of each allocated block an Arabic numeral represents the priority level at which the block is allocated. A continuous band of frequency is represented by a continuous set of one or more blocks.

Five users share the resource. The users include three ordinary users: communication ground stations 18a, 18b and 18c (FIG. 1). Each ordinary user has a priority agenda (not shown) containing a minimum allocation of one block, a maximum allocation of four blocks and one finite priority level. Therefore on request of a user, on the condition that no other blocks are currently allocated to the user, one block is allocated to the user at priority level infinity. On condition that the total number of blocks allocated to the user is less than four, further blocks are allocated at the finite priority level of the user. The finite priority level of each user in the embodiment of FIG. 4 is as follows: 3 for ground station 18a, 2 for ground station 18b, and 3 for ground station 18c. One fixed bandwidth user 21 (FIG. 1) and one dedicated band user 20 (FIG. 1) further share the frequency range. Block v is dedicated to user 20 and may not be allocated to any other user. The fixed bandwidth of user 21 is two blocks.

In time frame 42a there is already allocated one block according to request 46a from user 18a. One block is the minimum allocation of user 18a and therefore the priority level infinity is designated to the one block allocation. Also shown in time frame 42a, a second request 46b from new user 18b requesting two blocks. Resources have yet to be allocated to request 46b. Therefore request 46b is shown separate from the line segment representing frequency range 44a. According to the priority agenda, user 18b has access to priority level infinity on the condition that only one block is assigned to user 18b at priority level infinity, and user 18b has access to priority level two on the condition that not more than four total blocks are allocated to user 18b. In frame 42a, the priority level designated for each block in request 46b is shown inside the respective block.

In time frame 42b resources have been allocated to request 46b and two new requests 46d and 46c have not yet been allocated resources. Request 46d is made by user 21 therefore the request is for two continuous blocks and the priority of the request is infinity (because in this embodiment the entire bandwidth of a fixed bandwidth user is assigned as a minimum bandwidth). Request 46c is made by user 18c. Request 46c is for one block and the minimum bandwidth of user 18c is one block therefore request 46c receives the priority level infinity.

In time frame 42c one block previously allocated to request 46b has been preempted and the block allocated to request 46a has been moved in order to facilitate allocation of two continuous blocks to request 46d. After allocating two blocks to request 46d, all of the resource is allocated to users at their minimum allocation. Resources allocated at the minimum allocation cannot be preempted. Therefore there remain no available resources. Although block v is not allocated, block v is dedicated to dedicated band user 20 and cannot be allocated to an ordinary user. Therefore even though request 46c receives the priority level infinity, request 46c is blocked and receives no resources. In this embodiment the dedicated channel v can never be allocated to any user except for user 20 to whom the band is dedicated. Therefore, request 46e does not receive a priority level because block v is dedicated for user 20 and does not enter into the priority allocation system of ordinary and fixed bandwidth users. In frame 42d block v is allocated to fill request 46e. Alternatively, dedicated band v could be made available ordinary users at such times as user 20 is inactive. In such an alternative allocation, user 20 would have absolute priority to preempt other users from band v.

In time frame 42c, user 20 submits a request 46e for block v. The filling of request 46e is shown in time frame 42d.

Figure 5:
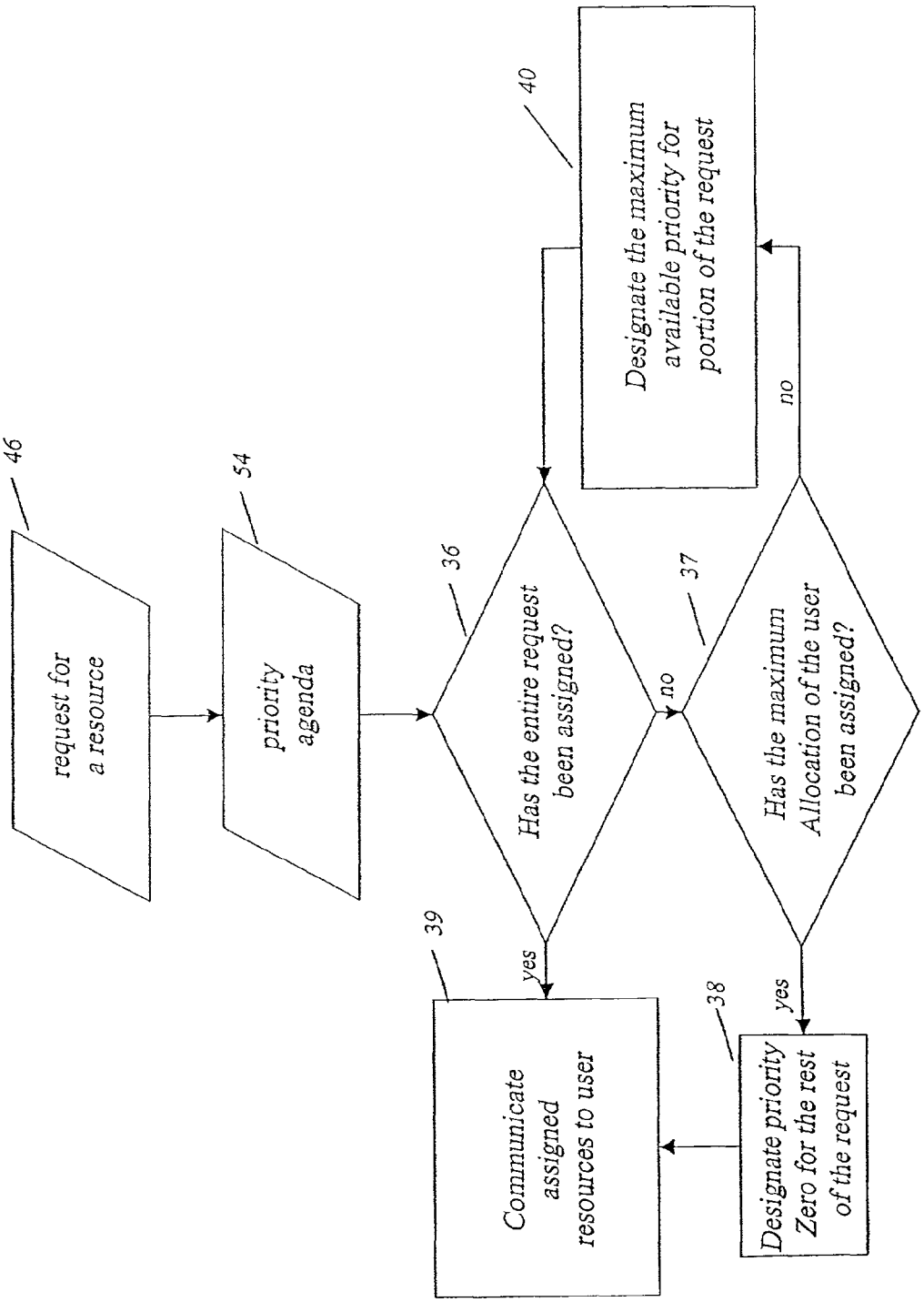
FIG. 5 is a flow chart illustrating yet another embodiment of a method for designating a priority for a portion of request for a resource wherein a user has access to an arbitrary set of priority levels.

A Method for Allocating a Resource Wherein a User Has Access to an Arbitrary Set of Priority Levels FIG. 5 is a flow chart illustrating a preferred embodiment of a method for designating a priority for a request for a resource.

In the example of FIG. 5, the user is a satellite ground station 18b and the resource 44 (FIG. 6) is a radio frequency range. Ground station 18b relays a request (step 46) (for example FIG. 6 request 46h) for a resource to controller 12. For example the available frequency range 44 is divided into two sub-ranges 44c and 44b (FIG. 6) and each sub-range is divided into eight blocks. A request for a resource is a request for a number of blocks. The possible magnitudes for an allocation are 1,2,3,4,5,6,7 or 8 blocks (any natural numbers less than 9 is a possible number of blocks). The magnitude of an allocation is constrained to a proper subset of the possible allocations. Specifically in the example of FIG. 6, the number of blocks in an allocation is constrained to be an integral power of 2. The subset of allowable magnitudes includes only the numbers 1, 2, 4, and 8. The subset $\{1, 2, 4, 8\}$ is a proper subset of the possible magnitudes $\{1, 2, 3, 4, 5, 6, 7, 8\}$. For example, ground station 18b makes a request 46h (FIG. 6) for eight frequency blocks. Controller 12 has access to a database 52 (FIG. 7) containing a user profile for ground station 18b including a priority agenda (FIG. 5, step 54). For example according to priority agenda 54h (see Table 2) ground station 18b has access to frequency blocks at various priority levels. Access to a priority level is conditional to the priority designated for other blocks for ground station 18b. Ground station 18b has a minimum allocation of one frequency block. The minimum allocation receives the priority level infinity, which is the highest possible priority level. Furthermore, to actually guarantee a minimum access to user 18b it is necessary to limit the accessibility of priority level infinity. According to agenda 54h, on condition that no other block is assigned to around station 18b with priority level infinity, ground station 18b receives one block assigned at priority infinity. There can be at most one block assigned to ground station 18b at priority infinity. Ground station 18b has access to priority level four on condition that a maximum of three blocks receive priority level four for ground station 18b. Similarly, ground station 18b has unlimited access to priority level two up until the maximum allocation of ground station 18b. Ground station 18b has a maximum allocation of eight blocks.

According to priority agenda 54h, priority is assigned for request 46 for eight blocks as follows: When request 46 is received, no resources have yet been assigned for ground station 18b. Therefore the answer to step 36 "has the entire request been assigned" and the answer to step 37 "has the maximum allocation of the user been assigned" are both "no". Therefore the process proceeds to step 40. The maximum available priority for request 46 is infinity. Because no blocks have yet received priority for ground station 18b, then the condition that "no other blocks have received the priority infinity" is fulfilled. Therefore a portion of request consisting of one block receives priority level infinity.

After designating a priority level for one block, the process returns to step 36. The answers to both 36 and 37 are still "no" therefore the process again reaches step 40. The priority level infinity is no longer available because priority level infinity has already been designated for a block. According to agenda 54h, ground station 18b does not have access to any priority level between four and infinity. Therefore, the highest available priority level is four. Designated priority level four for a portion of a request from ground station 18b is on the condition that not more than four blocks receive priority level four or greater for ground station 18b. Therefore a portion of request 46 consisting of 3 blocks receives a priority level four for allocation to ground station 18b.

After designating priority for two portions of request 46 consisting of a total of four blocks, the process returns to step 36. The answers to both 36 and 37 are still "no" therefore the process again reaches step 40. At this point the priority levels of infinity and four are no longer available. According to priority agenda 54h, ground station 18b does not have access to priority level three. Therefore, the highest available priority level is two. According to agenda 54h, request 46 receives a priority level two on the condition that no more than 8 blocks receive a priority level two or greater for ground station 18b. The remaining unassigned portion of request 46 consists of four blocks. Therefore the entire remaining unassigned portion of request 46 consisting of four blocks receives a priority level two for ground station 18b. Because all 8 blocks of request 46 have now received priority, the answer to question 36 is "yes". Therefore, the process ends, and the process proceeds to step 39, "communicate assigned resources to the user." Controller 18b is informed that the priority of request 46 is: one block receives priority level infinity, three blocks receive priority level four and four blocks receive priority level two.

Were ground station 18b to request more than 8 blocks, priority would be designated for 8 blocks only. After designating priority for 8 blocks, the answer to question 37 would be "yes" and the process would go to step 38 designated priority level zero for the remainder of the request. From step 38 the process ends by going to step 39 "communicate assigned resources to the user."

We refer again to FIG. 6, Which illustrates a preferred embodiment of a method for designating a priority for a request for a resource and for allocating the resource among a plurality of users. As opposed to the embodiment of FIG. 4 in the embodiment of FIG. 6, a user may have access to more than one finite priority level, and in the embodiment of FIG. 6, a new request at priority level infinity is a guaranteed access to resources.

FIG. 6 is divided into 6 time frames 42e-42j. Time frames 42e-42j are arranged in temporal order from left to right and separated by dark black lines. In FIG. 6 communication frequency bands are allocated from two communication satellites 14. One satellite has a range 44c of frequencies to be allocated and the second satellite has a range 44b of frequencies to be allocated. Each one of Ranges 44c and 44b is represented by a separate vertical line segment in FIG. 6. Ranges 44c and 44b are each divided into eight blocks. Each unallocated block is represented in FIG. 6 by a sub-segment that is not in contact with a rectangle. Each allocated block is represented by a sub-segment that is in contact with a rectangle on the left side of the segment. A continuous band of frequency is represented by a continuous set of one or more blocks. A continuous frequency band must be allocated from exactly one satellite.

In frame 42e, four frequency blocks have previously been allocated to fill a request 46f. The allocated frequency blocks are represented by the bottom four sub-segments of segment 44c, which are in contact with the rectangle representing request 46f. Also illustrated in frame 42e is a request 46g from a new user. Request 46g is for 8 continuous frequency blocks. Priority to resource requests in the example of FIG. 6 is designated according to the method of the flow chart of FIG. 5 and according to priority agendas (54g-k) of Table 2.

Priority had been designated for the four blocks of request 46f according to agenda 54f (see Table 2). The user of request 46f has access to one block at priority level three. Therefore priority level three is designated for one block. Furthermore, according to agenda 54f (see Table 2), the user of request 46f has access to three blocks at priority level two. Therefore priority level two is designated for three blocks. The priority level designated for each allocated block is shown in FIG. 6 to the right of each allocated block. According to agenda 54g (see Table 2), the user of request 46g has a minimum allocation of one frequency block. Therefore a portion of request 46g consisting of one block receives priority level infinity. In order to guarantee, access to at least one block to user 46g, the total number of blocks that are listed in priority agendas of all users at priority infinity must be less than the total extent of the resource, 16 blocks. Thus, only 16 users can be guaranteed one frequency block, or 15 users can be guaranteed one frequency block and one user can be guaranteed two frequency blocks, etc. According to the priority agendas of Table 2, only the users of agendas 54g and 54h have minimum resource allocations (and therefore have access to priority level infinity). Each of these two users has a minimum resource allocation of one block. Therefore the total number of blocks listed in the agendas of Table 2 at priority level infinity is two. Because the total extent of the resource is 16 blocks, a request for a resource at priority level infinity must always be filled. (Alternatively, the resource provider may sell minimum access to more than the total available resource. In such a case, users with minimum allocations have some small probability that a user will be denied the minimum allocation. A similar probability based minimum service exists in overbooked airline seats.) A second portion of request 46g consisting of three blocks receives a priority level four. Request 46g is for a total of eight blocks, but the maximum resource allocation of the user of request 46g is four blocks. Thus a portion of request 46g consisting of four blocks is above the maximum allocation of the user of request 46g. The portion of request 46g over the maximum allocation receives priority level zero and will not be allocated even though there are available free resources. In frame 42e the resource availability (see Table 1) can be summarized as follows: there are 12 blocks available at priority level 0, one block available at priority level three and three blocks available at a priority level two.

Also illustrated in frame 42e, as a pair of inwardly pointing arrows, is a request 47a to change the bandwidth of request 46f by a factor of $2^{-2}$ from four blocks to one block.

The next time step is illustrated in frame 42f. Request 46f has been contracted to one block according to request to change bandwidth 47a. The block receives the priority level three because three is maximum accessible priority level for the user of request 46f according to agenda 54f. Request 46g has been allocated the maximum allocation accessible to the user of request 46g according to agenda 54g. A new request 46h for eight blocks has yet to be filled. According to agenda 54h (see Table 2) of request 46h, a portion of request 46h consisting of one block receives priority level infinity. A second portion of request 46h consisting of three blocks receives priority level four, and a final portion of request 46h consisting of four blocks receives priority level two. In frame 42f the resource availability (see Table 1) can be summarized as follows: there are 11 blocks available to other users at priority level 0, one block available at priority level three, three blocks available at priority level four and one block that is not available at any priority level. In this embodiment, resource allocation within a priority level is on a first come first serve basis. Therefore, four or greater is a sufficient priority level to preempt a resource block available at priority level three.

The next time step is illustrated in frame 42g. In order to free 8 continuous blocks from range 44b to fill request 46h, request 46g has been moved to four blocks from the part of range 44c that was free in frame 42f. Request 46h has been completely filled by allocating all 8 blocks from the part of range 44b that was free in frame 42f. A new request 46i for four blocks has yet to be filled. According to agenda 54i (see Table 2) of request 46i, a portion of request 46i consisting of one block receives priority level four and a second portion of request 46i consisting of three blocks receives a priority level two. In frame 42g, the resource availability (see Table 1) can be summarized as follows: there are three blocks available at priority level zero, four blocks available at priority level two, one block available at priority level three, six blocks available at priority level four and two blocks are not available.

The next time step is illustrated in frame 42h. Because in frame 42g there are not enough continuous blocks available at priority level less than two to completely fill request 46i, therefore, only a portion of request 46i consisting of two blocks is filled in frame 42h. The two blocks allocated to request 46i are taken from part of range 44c that was free in frame 42g. According to the priority agenda 54i (see Table 2) of request 46i, the two blocks allocated to partially fill request 46i are assigned one block at priority level four and one block at priority level two. Although there remains an available block at priority level 0, the free block is not allocated to request 46i because allocating one more block to request 46i would result in a frequency band with a total of three blocks. In the example of FIG. 6, the magnitude of an allocated frequency band is constrained to number of blocks, the number being a whole power of 2. Thus a total of 1 ($2^0$), 2 ($2^1$), 4 ($2^2$) or 8 ($2^3$) continuous blocks may be allocated to fill request 46i but not 3, 5, 6 or 7 blocks. A new request 46j for eight blocks has yet to be allocated. According to agenda 54j (see Table 2) of request 46j, a portion of request 46j consisting of one block receives priority level five; a second portion of request 46j consisting of three blocks receives a priority level four, and a final portion of request 46j consisting of four blocks receives a priority level two. In frame 42h the resource availability (see Table 1) can be summarized as follows: there is one block available at priority level zero, five blocks available at priority level two, one block available at priority level three and 7 blocks available at priority level four, and two blocks are not available.

Also illustrated in frame 42h, as a pair of outwardly pointing arrows. is a request 47b to change the bandwidth of request 46f by a factor of $2^1$ from one block to two blocks.

The next time step is illustrated in frame 42i. There are not enough free blocks to fill request 46j, but the priority level of a portion of request 46j is five, and the priority level five is greater than the priority level of a part of the resource allocated to a current user. Specifically, the priority level five is sufficient to preempt a part of the resource allocated to a current user at a priority of 2. Request 46h contains blocks allocated at a priority of two. Therefore resources allocated to request 46h are partially preempted. Request 46h is contracted by a factor of two. Contracting request 46h by a factor of two frees 4 blocks that were allocated at priority level two. All four freed blocks are reallocated to fill a portion of request 46j. According to the priority agenda 54j (see Table 2) of request 46j, the priority of the four blocks allocated to request 46j is priority level five for one block and priority level four for three blocks. The remaining four blocks of request 46j have a priority level two. According to the availability of the resource in frame 42g there are not four blocks available at a priority level less than two. Therefore, the priority level two of remaining portion of request 46j is not sufficient for allocation of a part of the resource. Therefore request 46j is only partially filled. Similarly, according to the priority agenda of request 46h, the priority of the four remaining blocks allocated to request 46h is priority level infinity for one block and priority level four for three blocks. Furthermore in frame 42g request 46f has been expanded by a factor of two to two blocks according to request to change bandwidth 47b. To make available two continuous blocks for the expansion of request 46f, request 46g was switched from one four-block frequency band in range 44c to a different four-block frequency band within range 44c. According to the priority agenda 54f (see Table 2) of request 46f, the two blocks allocated to request 46f receive priority level three to one block and priority level two for one block. Also shown in frame 42i is request 46k for eight blocks. According to the priority agenda 54k, the user making request 46k has access to any finite priority level. Therefore, the user may specify the priority agenda including an arbitrary combination of priority levels one to five. The arbitrary agenda is applied to a request at the time of the request on the condition that the user does not exceed the maximum allocation of 8 blocks. For example in FIG. 6, the user of request 46k needs bandwidth for transmission of an important videoconference. Because the videoconference is an important application, the user specifies that all eight blocks receive a priority of five. Resources have yet to be assigned to request 46k. In frame 42i, the resource availability (see Table 1) can be summarized as follows: two blocks are available at priority level two, one block is available at priority level three, 10 blocks are available at priority level four, one block is available at priority level five and two blocks are not available at any priority level. In this embodiment, the correlation between the request 46k and the priority agenda is done in the terminal (by the user) and not in the controller. The advantage of correlating priority to the request at the terminal is that priority can be designated according to application. For an unimportant application (for example a web browser) the user would specify a lower priority (for example two). Thus, if there were simultaneously a web browser requiring two blocks and a video conference requiring three blocks then the user would request two blocks at priority level two and three blocks at priority level five.

The next time step is illustrated in frame 42j. Because of the high priority of request 46k, request 46k is completely filled. To fill request 46k requires completely freeing range 44b. Range 44b is freed by completely preempting request 46f and moving requests 46j and 46i to range 44c. Because request 46j contains a block with priority level five, request 46j partially preempts request 46h and one of the three blocks allocated to request 46h at priority level four is reallocated to request 46j at priority level five. Because the bandwidth of request 46h must be contracted by a factor that is a power of 2, then the total bandwidth allocated to request 46h is contracted by a factor of 2 to two blocks freeing the one block that is allocated to request 46j and one other block. The freed other block can be assigned at priority level four to request 46i or to request 46j. Because both requests 46i and 46j have the priority level four to receive the one other block, the one other block is allocated to request 46i (the earlier request) according to a first come first serve rule. In frame 42j, there are nine blocks available at priority level five and five blocks available at priority level four and two blocks that are unavailable. Because the user of request 46f does not have access to a priority level greater than three, request 46f has been completely preempted. Request 46f can only receive resources if another user requests a reduction of bandwidth, or another user cancels its resource use.

Thus, in the preferred embodiment of FIG. 6 there is illustrated, complete filling of a request for example the filling of request 46h in frame 42g. Also illustrated is the partial filling of a request, for example the partial filling of request 46j in frame 42i. Also illustrated is the partial preemption of an allocated resource, for example the partial preemption of a resource allocated to fill request 46b in frame 42i. Also illustrated is the complete preemption of an allocated resource, for example the complete preemption of the resource allocated to request 46f in frame 42j. Also illustrated is a request to increase an allocated bandwidth by a power of 2 (request 47b) and a request to decrease an allocated bandwidth by a factor of four (request 47a). Also illustrated in FIG. 6 is limitation of resource allocation to a maximum bandwidth. Specifically, the allocation of resources to request 46g in frame 42f is limited to the maximum resource allocation of the user of request 46g. Also illustrated is a minimum bandwidth allocation for example the allocation of bandwidth at priority infinity to request 46g in frame 42f.

A System for Allocating a Resource

Figure 7:
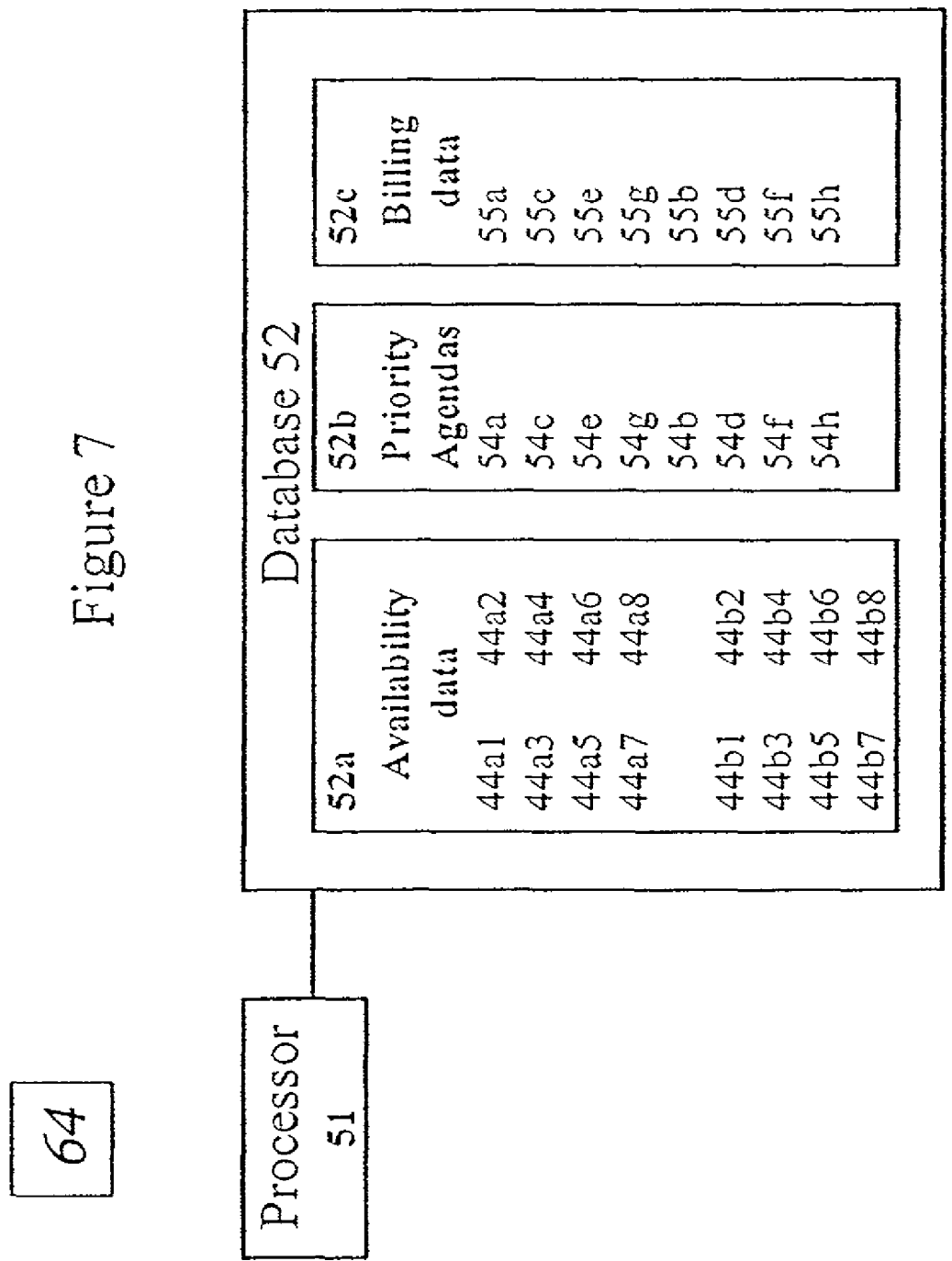
FIG. 7 illustrates a system for allocating a bandwidth according to the present invention.

We now refer to FIG. 7. FIG. 7 illustrates a system to determine a resource allocation according to the present invention. System 64 is a component of controller 12. System 64 includes a processor 51 and a database 52. Database 52 includes data on resource availability 52a (see FIG. 6), data on priority agendas 52b (see Table 2) and data on resource use 52c for billing (see Table 3). When a new user makes a request for allocation of a resource, processor 51 designates priority for the request based on the data in the new user's priority agenda as stored in agenda data 52b (see Table 2). Processor 51 then allocates resources to fill the request according to the priority of the request and according to availability of resources as recorded in availability data 52a. Processor 51 then updates the resource availability data 52a to reflect the allocation to the new user as well as changes made to current users to accommodate allocation of resources to the new user (for example preempting, switching, or moving a current user). Processor 51 periodically updates billing data 52c to include current resource use by the user and at billing dates processor 51 computes account billing based on billing data 52c.

A Method for Allocating a Resource Wherein a Request for a Minimum Allocation is Not Always Filled.

Figure 8:
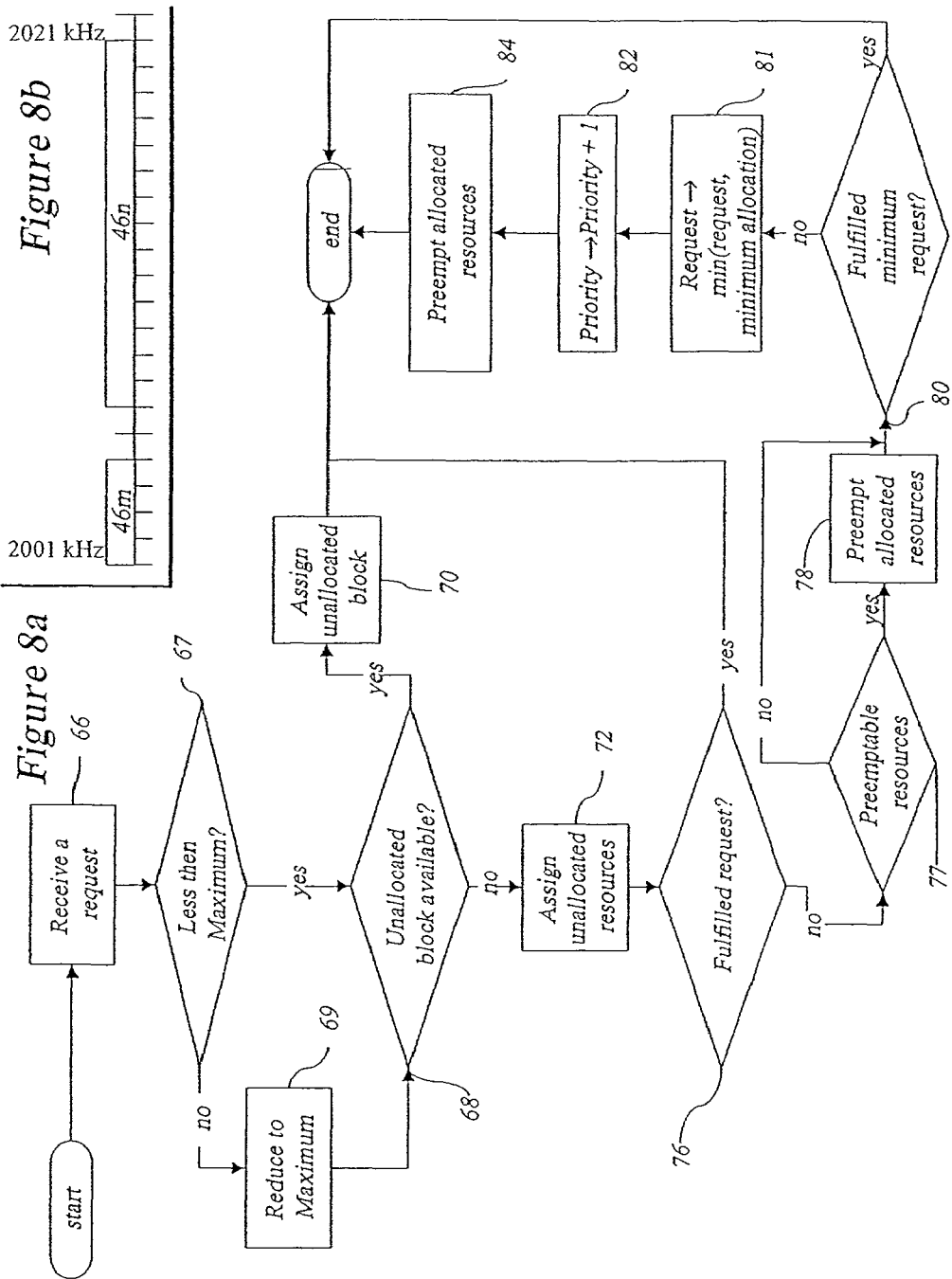

FIG. 8a is a flow chart illustrating a method for allocating a resource to fulfill a request from a user according to a priority agenda. In the embodiment of FIG. 8 there is a plurality of users. Each user has a priority agenda consisting of a minimum resource allocation, a single base priority level and a maximum resource allocation. The available priority levels are two, four, and six. As described in the following example, a user with higher base priority may preempt resources allocated to a prior user with a lower base priority. The quantity of resources allocated to the prior user after preemption must always be greater than or equal to the prior user's minimum allocation. A user may request a quantity of resources less than the user's minimum allocation If a request can not be fulfilled at a user's base priority, the resource provider will allocate a quantity of resources less than or equal to the user's minimum allocation at a priority level one greater than the user's base priority. Thus, in this embodiment a request for a minimum allocation does not receive a priority of infinity.

According to the method a resource provider receives 66 a request from a user for a continuous band of a resource. In the example of FIG. 8 the user requests a continuous frequency band of width 20 KHz, the resource provider first checks 67 the maximum resource allocation of the user in user's priority agenda. If the maximum allocation is greater than the sum of the current request plus any resources currently allocated to the user, then the process immediately proceeds to step 68 and starts to attempt to fulfill the request. If the sum of the request and resources currently allocated to the user is greater than the maximum allocation, then the request is reduced 69 until the sum is equal to the maximum allocation. For example, the requesting user (not shown) in the example of FIG. 8 has a maximum allocation of 15 KHz and has no currently allocated resources. Thus, the request for a 20 KHz frequency band is greater than the maximum allocation of the user. Therefore the request is reduced to a 15 KHz frequency band.

Having determined the size of the request, the resource provider begins searching 68 for an unallocated (free) frequency band that can completely fill the request. If there is an available unallocated band that fulfills the request, the unallocated band is assigned 70 to the user fulfilling the request and finishing the allocation process.

Initially in the example of FIG. 8, there are two small free frequency bands from 2005-2006 KHz and 2021 KHz (FIG. 8b). A band from 2001-2004 KHz is already assigned to a prior user 46m and a band from 2007-2020 KHz is already assigned to a prior user 46n. Therefore, there is not available a sufficient unallocated continuous band of resources to fulfill the request. All unallocated available resources up to the size of the request are assigned 72 to the user. In order to consolidate the free bands, the 14 KHz band of user 46n is switched to the band 2005-2018 KHz and the three KHz band 2019-2021 KHz is assigned to the requesting user. If 76 the assigning free resources fulfills the request then the process ends.

In the example of FIG. 8, the free resources (a three KHz band) do not fulfill the request (for a 15 KHz band). Therefore the resource provider searches 77 through resources already assigned to previous users for resources preemptable by the requesting user. Any preemptable resources are allocated 78 to fill the request If necessary resources allocated to previous users are switched to consolidate the newly allocated resources.

The priority agenda of the requesting user contains (as above) a maximum allocation of 15 KHz, a minimum allocation of four KHz and a base priority level of four. User 46m has a maximum allocation of 10 KHz, a minimum allocation of five KHz and a base priority level of two The user 46n has a maximum allocation of 15 KHz, a minimum allocation of 10 KHz and a base priority level of four. The quantity of resources assigned to user 46m is less than the minimum allocation of user 46m. Therefore no resources can be preempted from user 46m. The quantity of resources assigned to user 46n is four KHz more than the minimum allocation of user 46n. Thus, four KHz may be preempted from user 46n. Nevertheless, because the base priority level of user 46n user is equal to the base priority level of the requesting user, resources cannot be preempted from user 46n according to the base priority level of the requesting user. Thus, the priority agenda of the new user does not warrant completely filling the portion of the request above the minimum allocation. At the base priority level of the requesting user, no resources can be preempted from prior users and the process continues to step 80.

If 80 the quantity of resources already allocated to the requesting user fulfill the minimum allocation of the requesting user, then the process ends. Otherwise the resource provider attempts to fulfill at least a minimum request. First, the resource provider minimizes 81 the request by decreasing the request to either the minimum allocation of the user or the full request whichever is less. Then the resource provider increases 82 by one the priority of the reduced request. Finally the resource provider attempts to fill the reduced request by preempting 84 allocated blocks at the increased priority level.

Specifically in the example of FIG. 8, the resource allocated prior to step 80 is a three KHz frequency band. The minimum allocation of the requesting user, four blocks, has not yet been allocated. Therefore, the size of the request is reduced 81 to the minimum allocation, four blocks and the priority is increased 82 by one to five. The increased priority level is greater than the priority level of the second user. Therefore the requesting user preempts 84 one block from user 46n, reducing the bandwidth of user 46n from 14 blocks to 13 blocks. Thus the priority agenda of the requesting user warrants partially fulfilling the request by assigning four blocks from available free resources and preempting one block from the second previous user. The process then ends, partially fulfilling the request by allocating the requesting user's minimum bandwidth.

A Method for Modifying Allocation of a Resource

Figure 9:
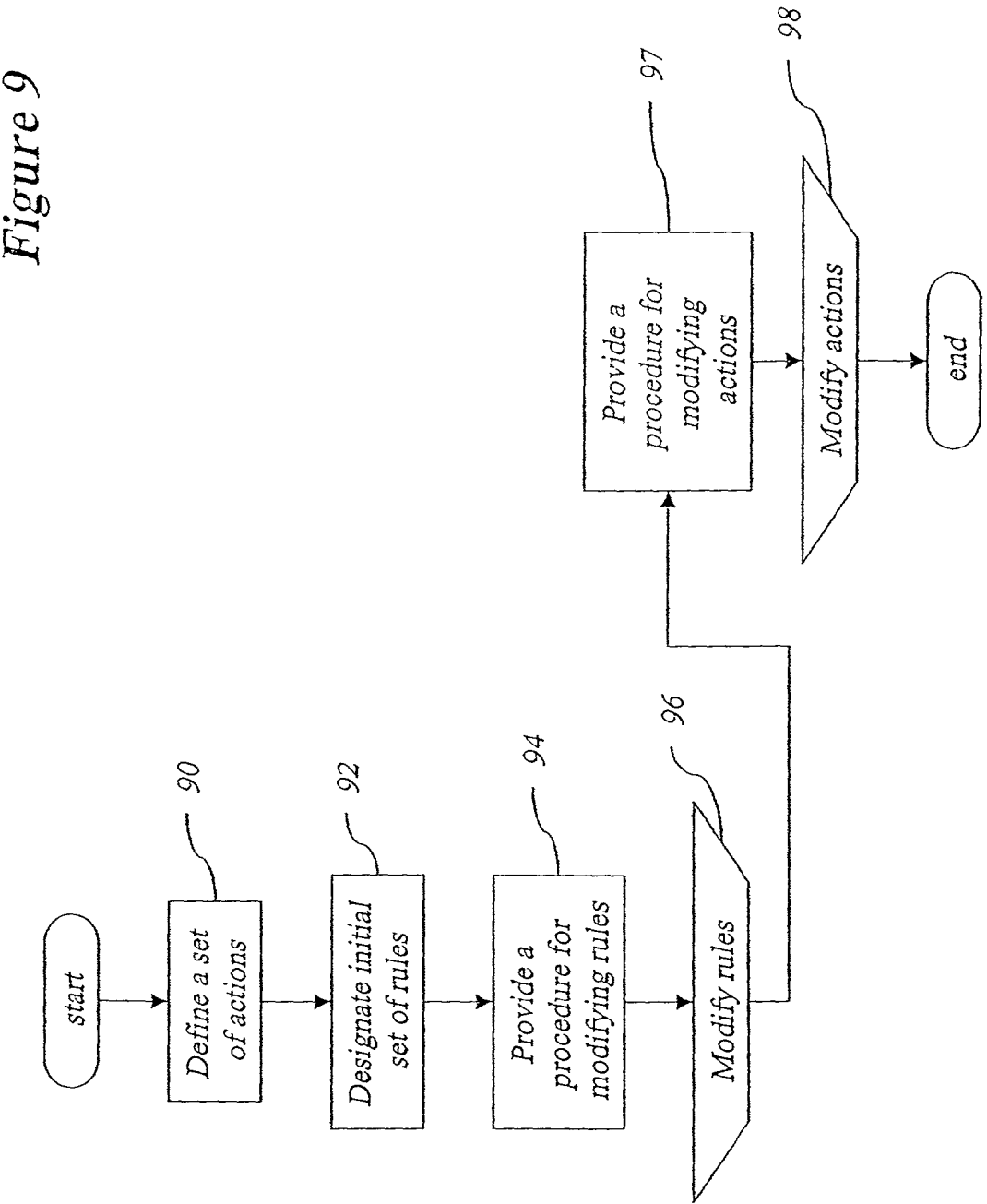
FIG. 9 is a flow chart illustrating an embodiment of a method for modifying allocation of a resource.

FIG. 9 is a flow chart illustrating an embodiment of a method for modifying allocation of a resource. A set of potential actions is defined 90 and an initial set of rules delineating when to perform each action 92.

Particularly, the initial actions and rules of the embodiment of FIG. 9 correspond to the method of FIG. 8 and are illustrated in Table 4. When there are free resources the resource provider assigns free resources to a new request unconditionally. When switching resources allocated to a prior user will help fulfill a request, the resources are switched unconditionally. When there are not enough resources to fulfill a minimum request (a minimum request is defined as either the requested resources or the users minimum allocation, whichever is less) at the requesting user's base priority level, the priority level of a request is increased by 1. Resources are preempted from a prior user when the quantity of resources allocated to the prior user is greater than the minimum allocation of the prior user and when the priority level of the request is higher than the priority of the prior user. Preempting a resource in the embodiment of FIG. 9 means transferring the maximum quantity of resources from the prior user to the requesting user. The maximum quantity of resources is either the quantity of resources needed to fulfill the request or the quantity of resources allocated to the prior user above the minimum allocation of the previous user, whichever is less. For example according to the original rules of the example of FIG. 9, resources are never split. ("Split", with reference to the embodiment of FIG. 9 means that half of the maximum quantity of resources is transferred to the requesting user and half of the maximum quantity of resources remains allocated to the prior user.)

A procedure is provided 94 for modifying the rules. Particularly, in the example of FIG. 9, the procedure for modifying rules is editing the rules on an interactive user interface. Thus, for example, the resource provider logs onto a computer controlling resource allocation and opens an interactive editor. On the editor the resource provider may modify 96 the rule for splitting resources from "never" to "when the priority level of the previous user is equal to the priority level of the request".

Alternatively, the procedure for modifying rules may be a computer algorithm. For example, with the initial actions and rules of Table 4, an algorithm detects when the system is congested. Congestion could be defined, for example, as all resources are allocated 90% of the time over a one-hour period. Nvhen congestion occurs, the algorithm changes the rule for resources splitting as above from "never" to "when the request and the prior user have an equal priority level".

Thus, in the example of FIG. 8, according to the new rule for splitting resources, the answer at step 77 becomes yes because the extra resources of the second prior user are now available to split with the requesting user at priority level four. Therefore at step 78 the four blocks allocated to the second prior user above the minimum allocation of the second prior user are split. Two blocks are assigned to the requesting user giving a total of five blocks to the requesting user and two blocks remain with the second prior user. Now, upon reaching step 80, the requesting user has been assigned five blocks. Five blocks is greater than the minimum allocation (four blocks) of the requesting user and the process ends.

Also in FIG. 9 a procedure is supplied 97 for modifying the actions. For example, in FIG. 9 the procedure for modifying actions is editing on an interactive user interface. The resource provider logs onto the computer controlling resource allocation and opens an interactive editor. On the editor the resource provider modifies 98 the action of splitting a resource allocation so that when a resource allocation is split, each user receives a portion of the split resource proportional to the unfulfilled resources requested by the user.

Particularly, in the example of FIG. 8, according to the new definition of splitting, when the process reaches step 77, the requesting user has been assigned three blocks and has an unfulfilled requirement of twelve blocks. The second prior user is assigned four preemptable blocks. Therefore $4 \times 12/(12+4)=3$ blocks are transferred to the requesting user giving a total of six blocks to the requesting user. As in the previous example with splitting, at step 80 the minimum request has already been filled and therefore the process ends.

Access Channels

Figure 10:
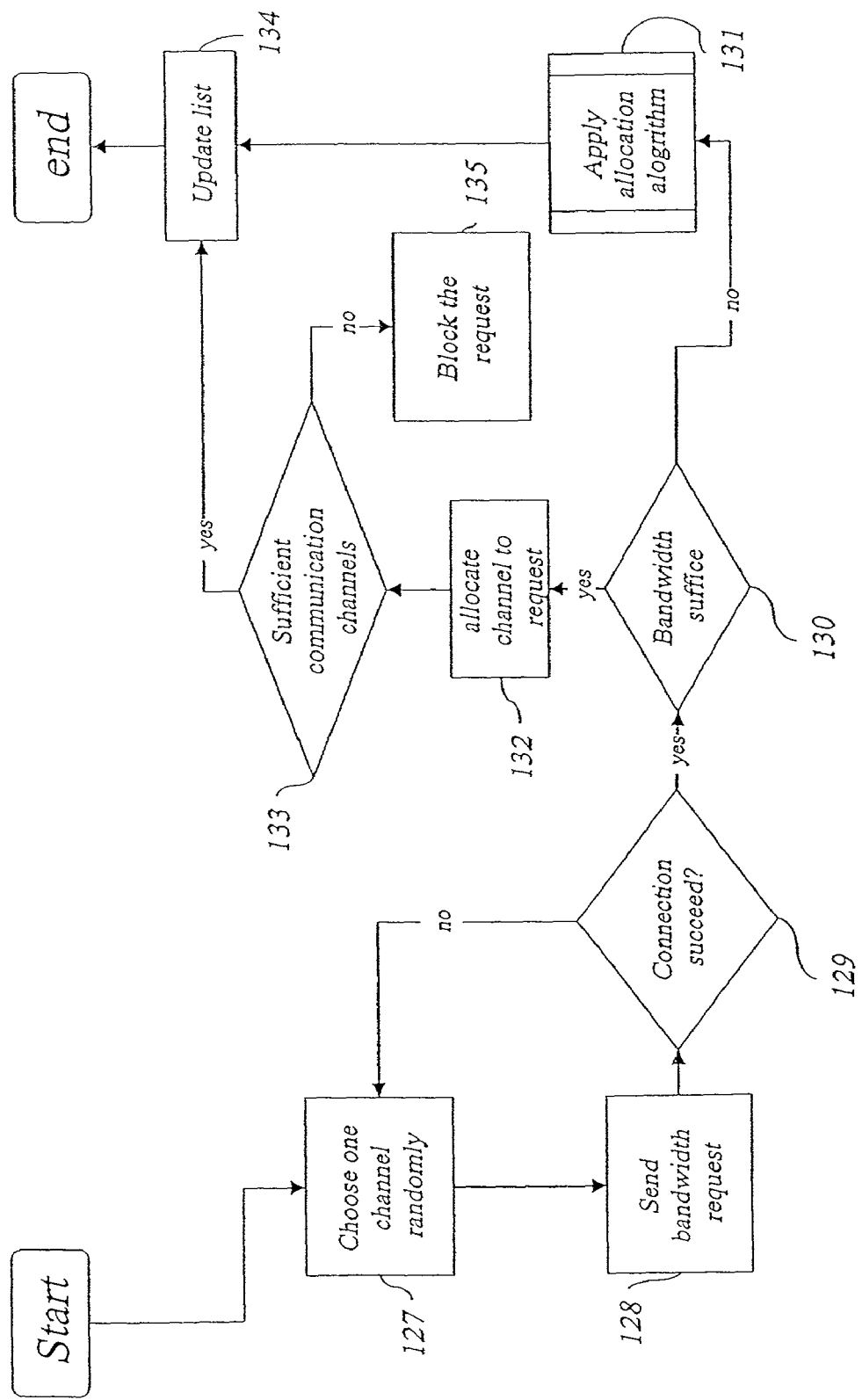
FIG. 10 is a flow chart illustrating a method of apportioning a resource between a new user and a current user using access channels.

Referring now to FIG. 10, a user wishing to send request for bandwidth chooses 127 at random an access channel from the list of available access channels and sends 128 the request on the chosen access channel. The access channels are 20 provided from an unused part of the resource. The unused part of the resource results because the resource allocation method is not "perfect" and leaves "holes" in the bandwidth especially if the allocation is done with a limited number of operations ($\lambda$) (disconnections). The "holes" are used as access channels. If a different user making a request blocks the access channel then the request does not succeed 129 in being received and a new access channel is chosen 127 and the request re-sent 128. When the request succeeds 129 at being received the controller determines 130 if the bandwidth of the access channel is sufficient to fill the request. If the bandwidth is not sufficient new bandwidth is sought 131 using the search algorithm illustrated in FIGS. 2a-d. If filling the request entailed changing the location of access channels, then the list of access channels is updated 134, and the process ends.

If the controller determines 130 that the bandwidth of the access channel suffices to fill the request, then the access channel is allocated 132 to the new user. Assigning the access channel results in a change in the number of free access channels. Therefore the controller checks 133 whether there remain enough free access channels. If there remain enough free access channels, then the process ends. If there do not remain sufficient access channels, then the controller blocks the request 135, denying resources to the user. While the invention has been described with respect to a limited number of embodiments, it will be appreciated that many variations, modifications and other applications of the invention may be made. It will be appreciated that the above descriptions are intended only to serve as examples, and that many other embodiments are possible within the spirit and the scope of the present invention.

Tables

TABLE 1

Resource availability - the number of blocks available at various priority levels for each time frame in the embodiment of FIG. 6

| PRIORITY LEVEL | Time Frame | | | | |
|---|---|---|---|---|---|
| | 42e | 42f | 42g | 42h | 42i | 42j |
| not available | | 1 | 2 | 2 | 2 | 2 |
| 5 | | | | | 1 | 9 |
| 4 | | 3 | 6 | 7 | 10 | 5 |
| 3 | 1 | 1 | 1 | 1 | 1 | |
| 2 | 3 | | 4 | 5 | 2 | |
| 1 | | | | | | |
| 0 | 12 | 11 | 3 | 1 | | |

TABLE 2

Priority Agendas - A priority level to which each potential user has access and a condition under which the user has access to the priority level.

| PRIORITY LEVEL | Condition (maximum blocks) | | | | | |
|---|---|---|---|---|---|---|
| | 54f | 54g | 54h | 54i | 54j | 54k |
| infinity | | 1 | 1 | | | |
| 5 | | | | | 1 | * |
| 4 | | 3 | 3 | 1 | 3 | * |
| 3 | 1 | | | | | * |
| 2 | 3 | | 4 | 3 | 4 | * |
| 1 | | | 4 | 4 | | * |
| Maximum# | 4 | 4 | 8 | 8 | 8 | 8 |

In Table 2, an empty box means that the user corresponding to the box does not have access to the priority level corresponding to the box.
Access to the resource by every user is conditional to the total resourse allocation of the user not exceeding the listed maximum.
*The user has access to an arbitrary set of priority levels from 1-5 conditional to the preferred priority specified by the user for each request at the time of the request.

Unless otherwise stated, in Table 2. a user has access to a priority level on the condition that the number of blocks assigned at the priority level does not surpass the number listed in the box corresponding to the user and the priority level.

In Table 2, an empty box means that the user corresponding to the box does not have access to the priority level corresponding to the box.

Access to the resource by every user is conditional to the total resource allocation of the user not exceeding the listed maximum.

*The user has access to an arbitrary set of priority levels from 1-5 conditional to the preferred priority specified by the user for each request at the time of the request.

TABLE 3

User Billing Data - number of resource block-time slots used at each priority level for the entire time period in the example of FIG. 6.

| PRIORITY LEVEL | User | | | | | |
|---|---|---|---|---|---|---|
| | 46f | 46g | 46h | 46i | 46j | 46k |
| infinity | | 5 | 4 | | | |
| 5 | | | | | 2 | 8 |
| 4 | | 15 | 10 | 3 | 3 | |
| 3 | 5 | | | 2 | | |
| 2 | 4 | | 4 | | | |
| 1 | | | | | | |

TABLE 4

Initial actions and rules - the initial actions and rules delineating the performance of the actions according to the embodiment of FIG. 9

| Action | Rule |
|---|---|
| Assign free resources | free resources and incompletely fulfilled request |
| Switch resources | Whenever will increase fulfillment of request |
| Change priority | cannot fulfill minimum request at base priority |
| Split resource | never |
| Preempt resources | priority level of requesting user is higher than priority level of prior user and prior user has more than minimum resources |

What is claimed is:

1. A central controller for assigning frequency bandwidth on demand amongst a plurality of users, wherein a particular user of said plurality of users has access at a high priority level to a small quantity of bandwidth and has access at a low priority level to extra bandwidth, the central controller comprising:
 a) a priority agenda of the particular user configured for storing:
  i) the high priority level;
  ii) a maximum bandwidth accessible at the high priority level, and
  iii) the low priority level for receiving the extra bandwidth;
 b) a memory configured to store data on availability of frequency bands, and
 c) a processor configured for:
  i) searching said data for a first continuous frequency band available at the high priority level;
  ii) allocating said first continuous frequency band to the particular user to fill a portion of a requested bandwidth, and
  iii) when said requested bandwidth is greater than said maximum bandwidth accessible at the high priority level,
   A) Designating the low priority level to a remaining portion of said requested bandwidth;
   B) further searching said data for a second frequency band available at the low priority level, said second frequency band continuous to said first continuous frequency band, and
   C) further allocating said second frequency band to the particular user to fill said remaining portion of said requested bandwidth.

2. The central controller of claim 1 wherein said processor is further configured to perform said searching employing a sliding window.

3. The central controller of claim 1 wherein said processor is further configured for:
   iv) dividing the frequency bandwidth into blocks and wherein said first continuous frequency band is a number blocks and wherein said number is selected from a plurality of numbers wherein each number of said plurality of numbers is an integral power of 2.

4. The central controller of claim 1 wherein said processor is further configured for performing at least one function selected from the group consisting of switching a previously allocated frequency band, completely preempting a previously allocated frequency band, and partially preempting a previously allocated frequency band.

5. The central controller of claim 1 wherein said first continuous frequency band is constrained to be equal to said requested bandwidth contracted by an integral power of 2.

6. The central controller of claim 1, wherein said processor is further configured for:
   iv) optimizing said allocating.

7. The central controller of claim 6, wherein said optimizing is with respect to at least one goal selected from the group consisting of maximization of frequency bandwidth availability, maximization of utility, minimization of cost, a trade-off between user interruption and bandwidth utilization and maximization of revenue to a resource provider.

8. The central controller of claim 1, wherein the bandwidth of said first continuous frequency band is the minimum between said requested bandwidth, said maximum bandwidth and an available continuous bandwidth at the high priority level.

9. The central controller of claim 1, wherein the bandwidth of said second frequency band is the minimum between a difference between said requested bandwidth and said first continuous bandwidth and an available continuous bandwidth at said second priority level.

10. The central controller of claim 1, wherein said priority agenda further includes
    iv) a lower priority level, lower than said low priority level, and
    v) a second maximum bandwidth accessible at said low priority level, and said processor is further configured for:
    iv) when said requested bandwidth is greater than the sum of said maximum bandwidth accessible at the high priority level and said second maximum bandwidth available at the low priority level,
       A) Designating said lower priority level to a further remaining portion of said requested bandwidth;
       B) further searching said data for a third frequency band available at said lower priority level, said third frequency band continuous to the continuous frequency band consisting of said first continuous frequency band and said second frequency band, and
       B) further allocating said third frequency band to the particular user to fill said further remaining portion of said requested bandwidth.

11. A method of assigning frequency bandwidth on demand amongst a plurality of users, wherein a particular user of said plurality of users has a high priority access to small quantities of bandwidth and low priority access to extra bandwidth the method comprising:
    a) providing a priority agenda for the particular user including:
       i) the high priority level;
       ii) a maximum bandwidth accessible at said high priority level, and
       iii) the low priority level for receiving the extra bandwidth;
    b) storing data on availability of frequency bands, and
    c) searching said data for a first continuous frequency band available at the high priority level;
    d) allocating said first continuous frequency band to the particular user to fill a portion of a requested bandwidth, and
    e) when said requested bandwidth is greater than said maximum bandwidth accessible at the high priority level,
       i) further searching said data for a second frequency band available at the low priority level, said second frequency band continuous to said first continuous frequency band, and
       ii) further allocating said second frequency band to the particular user.

12. The method of claim 11, further including:
    c) optimizing said allocating.

13. The method of claim 11, wherein said optimizing is with respect to at least one goal selected from the group consisting of maximization of resource availability, maximization of utility, minimization of cost, a trade-off between user interruption and bandwidth utilization and maximization of revenue to a resource provider.

* * * * *